US011657284B2

(12) United States Patent
Kim et al.

(10) Patent No.: US 11,657,284 B2
(45) Date of Patent: May 23, 2023

(54) NEURAL NETWORK MODEL APPARATUS AND COMPRESSING METHOD OF NEURAL NETWORK MODEL

(71) Applicant: SAMSUNG ELECTRONICS CO., LTD., Suwon-si (KR)

(72) Inventors: Jaedeok Kim, Suwon-si (KR); Chiyoun Park, Suwon-si (KR); Youngchul Sohn, Suwon-si (KR); Inkwon Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 369 days.

(21) Appl. No.: 16/868,136

(22) Filed: May 6, 2020

(65) Prior Publication Data
US 2020/0364574 A1 Nov. 19, 2020

Related U.S. Application Data

(60) Provisional application No. 62/848,763, filed on May 16, 2019.

(30) Foreign Application Priority Data

Sep. 10, 2019 (KR) .................. 10-2019-0112019

(51) Int. Cl.
*G06N 3/08* (2023.01)
*G06N 3/082* (2023.01)
*G06N 3/045* (2023.01)

(52) U.S. Cl.
CPC ............. *G06N 3/082* (2013.01); *G06N 3/045* (2023.01)

(58) Field of Classification Search
USPC .......................... 706/25; 704/202, 232, 259
See application file for complete search history.

(56) References Cited

U.S. PATENT DOCUMENTS

| 10,229,356 | B1 | 3/2019 | Liu et al. |
|---|---|---|---|
| 10,762,426 | B2 | 9/2020 | Li et al. |
| 10,832,123 | B2 | 11/2020 | Sun et al. |
| 2003/0158830 | A1 | 8/2003 | Kowalczyk et al. |
| 2017/0132527 | A1 | 5/2017 | Ahn et al. |
| 2017/0132528 | A1 | 5/2017 | Aslan et al. |
| 2018/0114114 | A1 | 4/2018 | Molchanov et al. |

(Continued)

FOREIGN PATENT DOCUMENTS

| CN | 107480770 A | 12/2017 |
|---|---|---|
| CN | 108510083 A | 9/2018 |

(Continued)

OTHER PUBLICATIONS

International Search Report and Written Opinion 005686 (PCT/ISA/210 and PCT/ISA/237) dated Aug. 14, 2020, issued by the International Searching Authority in International Application No. PCT/KR2020/005686.

(Continued)

*Primary Examiner* — Leonard Saint-Cyr
(74) *Attorney, Agent, or Firm* — Sughrue Mion, PLLC

(57) ABSTRACT

An electronic apparatus for compressing a neural network model may acquire training data pairs based on an original, trained neural network model and train a compressed neural network model compressed from the original, trained neural network model using the acquired training data pairs.

18 Claims, 22 Drawing Sheets

(56) References Cited

U.S. PATENT DOCUMENTS

| | | |
|---|---|---|
| 2018/0173944 A1 | 6/2018 | Feris et al. |
| 2019/0034781 A1* | 1/2019 | Asano .................. G06N 5/04 |
| 2019/0075301 A1 | 3/2019 | Chou et al. |
| 2019/0087729 A1 | 3/2019 | Byun et al. |
| 2019/0393903 A1* | 12/2019 | Mandt ............... H03M 13/6502 |
| 2020/0293876 A1* | 9/2020 | Phan .................. H03M 7/702 |
| 2020/0348993 A1* | 11/2020 | Ozonat ................ G06F 1/206 |
| 2020/0351171 A1* | 11/2020 | Ozonat ................ H04L 41/16 |
| 2020/0364408 A1* | 11/2020 | Lao .................... G06F 40/30 |
| 2021/0192357 A1* | 6/2021 | Sinha .................. G06N 3/088 |

FOREIGN PATENT DOCUMENTS

| | | |
|---|---|---|
| CN | 108780519 A | 11/2018 |
| JP | 6374573 B1 | 8/2018 |
| KR | 10-1939106 B1 | 1/2019 |
| WO | 2017/156547 A1 | 9/2017 |
| WO | 2020/233130 A1 | 11/2020 |

OTHER PUBLICATIONS

Tung et al., "Fine-Pruning: Joint Fine-Tuning and Compression of a Convolutional Network with Bayesian Optimization," arXiv:1707.09102v1, Jul. 2017, total 14 pages.
Communication dated Apr. 29, 2022, issued by the European Patent Office in European Application No. 20804770.4.

* cited by examiner

FIG. 8A

| Depth | TEST MODEL |
|---|---|
| 1 | Conv (5, 20) |
| 2 | MaxPool |
| 3 | Conv (5, 50) |
| 4 | MaxPool |
| 5 | FC 500 |
| 6 | FC 10 |

FIG. 9

| DEVICE | MODEL SIZE | COMPUTATIONAL QUANTITY | RESPONSE RATE | ACCURACY ERRORS |
|---|---|---|---|---|
| EARPHONE 'A' | WITHIN 5 MB | WITHIN 5 MFLOPs | WITHIN 100 ms | WITHIN 10 % |
| TV 'b' | WITHIN 10 MB | WITHIN 10 MFLOPs | WITHIN 100 ms | WITHIN 5 % |
| SMARTPHONE 'C' | WITHIN 100 MB | WITHIN 50 MFLOPs | WITHIN 100 ms | WITHIN 5 % |
| SMARTPHONE 'D' | WITHIN 300 MB | WITHIN 200 MFLOPs | WITHIN 80 ms | WITHIN 2 % |

NEURAL NETWORK MODEL APPARATUS AND COMPRESSING METHOD OF NEURAL NETWORK MODEL

CROSS-REFERENCE TO RELATED APPLICATIONS

This application is based on and claims priority under 35 U.S.C. § 119 to Korean Patent Application No. 10-2019-0112019, filed on Sep. 10, 2019, in the Korean Intellectual Property Office and claims the benefit of U.S. Provisional Application No. 62/848,763, filed on May 16, 2019, in the United States Patent and Trademark Office, the disclosures of which are incorporated by reference herein in their entireties.

BACKGROUND

1. Field

The disclosure relates to an electronic apparatus configured for compressing a neural network model and a corresponding method thereof. More specifically, the disclosure relates to an electronic apparatus for recovering performance deterioration generated in the process of compressing an already trained neural network model and a corresponding method thereof.

2. Description of the Related Art

An artificial neural network may be designed and trained to perform a wide range of functions. Technologies applying artificial neural networks may include image processing, voice recognition, inference/prediction, knowledge expression, operation control and the like. Accordingly, many layers and parameters (weights) may be included in deep neural network models for performing the wide variety of functions of various technologies.

Deep neural networks generally have a tendency to show better performance with increasing usage of a large scale model having many layers according to a large amount of training data from a large scale database.

Accordingly, based on devices such as a smartphone, a robot, a home appliance, and an Internet of Things (IoT) device applying the neural network model in an on device form, compressing and loading the neural network model may be necessary in consideration of the limitation of the device resources to minimize memory usage, computational complexity, power consumption, or the like.

In addition, a cloud application server such as a data center that processes millions of processes also may require compression of a neural network model.

FIG. 1 is a diagram illustrating a general neural network model compression processor.

Referring to FIG. 1, a neural network model compression pipeline 10 is configured to perform a model compression 11 and a fine tuning 12 process.

An original model 1 provided as input to the neural network model compression pipeline 10 may be output as a first compression model 2 through a model compression module 11 though processes such as Weight Pruning, Channel Pruning, Matrix Factorization, and Quantization. The first compression model 2 may have performance lower than the performance of the original model 1.

In order to recover performance, the first compression model 2 may be trained based on an actual training data (for example, actual training data used while generating the original model) through a fine tuning module 12, and a final compression model 3 with recovered performance compared to the first compression model may be acquired as a result of tuning the first compression model 2.

Based on optimizing a part of the original model 1 in the model compression process, problems of deterioration in performance compared to the original model may arise, and a process of fine tuning using actual training data to recover the deteriorated performance is necessary. Fine tuning is performed not only in model compression, but also in incremental learning, transfer learning and the like.

Accordingly, although an actual training dataset is required for the fine tuning, problems, such as not retaining the actual training dataset used when generating the original model or not being able to share the actual training dataset for personal or legal reasons, may arise.

SUMMARY

According to an embodiment of the disclosure, there is provided an electronic apparatus including a memory storing computer-readable instructions and a processor which when executing the computer-readable instructions is configured to obtain an original neural network model, compress the original neural network model according to a compression algorithm, to obtain a compressed neural network model, acquire training data pairs for training the compressed neural network model, based on the original neural network model, and train the compressed neural network model using the training data pairs, to obtain a compressed and trained neural network model.

According to an embodiment of the disclosure, there is provided a method of an electronic apparatus compressing a neural network model including generating a compressed neural network model by compressing an original neural network model using a compression algorithm, generating a training data pairs based on the original neural network model, and generating a compressed and trained neural network model by training the compressed neural network model based on the training data pairs.

According to an embodiment of the present disclosure, there is provided a server apparatus including a memory storing computer-readable instructions, a communicator, and a processor which when executing the computer-readable instructions is configured to compress an original neural network model according to a compression algorithm, to acquire a compressed neural network model, acquire a training data pairs for training the compressed neural network model based on the original neural network model, train the compressed neural network model based on the training data pairs, to obtain a compressed and trained neural network model, and output the compressed and trained neural network model through the communicator.

BRIEF DESCRIPTION OF THE DRAWINGS

The above and other aspects, features and advantages of certain embodiments of the disclosure will be more apparent from the following detailed description, taken in conjunction with the accompanying drawings, in which:

FIGS. 8A, 8B and 8C are tables and graphs showing test results for describing an effect of an electronic apparatus generating and using a new training data;

FIG. 9 is a table for describing an example of an electronic apparatus having a different size or dimension of a compressed model according to a performance of a target apparatus;

DETAILED DESCRIPTION

Figure 1:
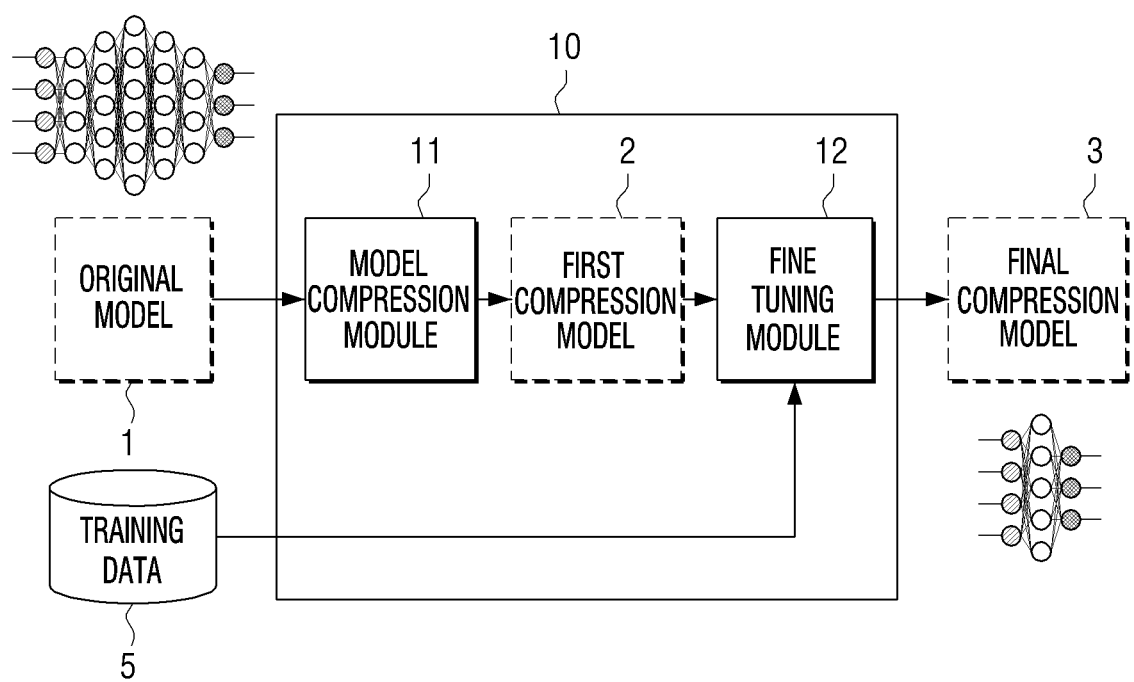
FIG. 1 is a diagram illustrating a general neural network model compression process.

The disclosure provides a compression method of a neural network model, the compression method generating a training dataset from a trained neural network model.

In addition, an electronic apparatus acquiring a compression neural network model having good performance and high accuracy, despite not having training dataset used in training an original neural network model, is provided.

Further, the disclosure provides a server capable of providing a compression model despite not having a training dataset and a compressing method thereof.

Further, the disclosure provides an AI application service server apparatus that compresses and provides an application including a neural network model accordingly to specification and methods thereof.

The embodiments of the disclosure will be described in greater detail below.

The terms used in the disclosure have been selected from general terms currently widely understood in consideration of the functions in the various example embodiments of the disclosure, but may be changed according to the intention of those skilled in the related art or precedent, emergence of new technologies, and the like. The disclosure may use newly selected terms, and the meanings thereof will be disclosed in detail in the descriptions relevant to the disclosure. Accordingly, terms used in the disclosure are not simply understood by the term, but are defined based on the meaning of the term and the context throughout the disclosure.

Further, like reference numerals indicate like components that perform substantially the same functions throughout the disclosure. For convenience of description and understanding, the same reference numerals or symbols are used and described in different example embodiments. In other words, although elements having the same reference numerals are all illustrated in a plurality of drawings, the plurality of drawings do not refer to one embodiment.

Further, terms including ordinal numbers such as "first," "second," and so on may be used to describe a variety of elements in the disclosure. The ordinal numbers may be used for the purpose of distinguishing same or like elements, but the elements should not be limited by these terms. For example, the elements associated with the ordinal numbers should not be limited in order or order of use by the numbers. If necessary, the ordinal numbers may be replaced with each other.

A singular expression includes a plural expression, unless otherwise specified. It is to be understood that the terms such as "comprise" or "consist of" are used herein to designate a presence of a characteristic, number, step, operation, element, component, or a combination thereof, and not to preclude a presence or a possibility of adding one or more of other characteristics, numbers, steps, operations, elements, components or a combination thereof.

The term such as "module," "unit," "part," and so on is used to refer to an element that performs at least one function or operation, and such element may be implemented as hardware or software, or a combination of hardware and software. Further, except for when each of a plurality of "modules," "units," "parts," and the like need to be implemented in an individual hardware, the components may be integrated in at least one module or chip and be realized in at least one processor.

Also, when any part is connected to another part, this includes not only a direct connection, but also an indirect connection through another medium. Further, when a certain part includes a certain element, unless specified to the contrary, this means that another element may be additionally included, rather than precluding another element.

An operation compressing an original neural network model to acquire or obtain a compression neural network model may include a first process that reduces the data size by removing/changing at least a portion of the neural network model and a second process (fine tuning) that trains the neural network model with the reduced data size.

However, from the above-described first and second processes, the first process itself may be seen as a 'compression' of the neural network model, and accordingly, the second process may be explained as a process for training a 'compression neural network model' (or first compression neural network model) that is compressed through the first process.

For the convenience of description and to prevent confusion, expressions such as 'compression,' compressed,' and 'first compressed' in the embodiments below are disclosed to only denote the first process that reduces model size by removing/changing at least a portion of the original neural network model. Further, the 'compression neural network model' (or first compression neural network model), which is a compression of an original neural network model, is disclosed as denoting a state in which a second process is not yet performed.

The disclosure will be described in greater detail below with reference to the drawings.

Figure 2:
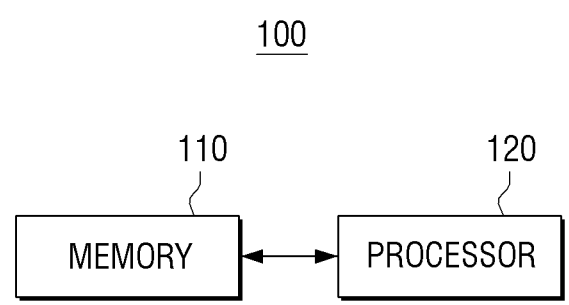
FIG. 2 is a block diagram illustrating a configuration of an electronic apparatus according to an embodiment of the disclosure.

FIG. 2 is a block diagram illustrating a configuration of an electronic apparatus 100 according to an embodiment of the disclosure.

An electronic apparatus 100 may be implemented as any one of various devices such as a smartphone, a server apparatus, a desktop PC, a notebook PC, a tablet PC, a TV, a set top box, a kiosk, and a wearable device. Alternatively, the electronic apparatus 100 may be implemented in a system form including a plurality of distributed devices capable of communicating with one another.

Referring to FIG. 2, the electronic apparatus 100 may include a memory 110 and a processor 120.

The memory 110 may store various data related to an operating system (OS) and elements of an electronic apparatus 100 for controlling operations of elements of the electronic apparatus 100. The memory 110 may include software, programs, and at least one instruction for controlling functions of one or more elements of the electronic apparatus 100.

The memory may be implemented as a non-volatile memory (e.g., hard disk, solid state drive (SSD), flash memory), a volatile memory, or the like.

The processor 120 may control the operation of the electronic apparatus 100. The processor 120 may include a central processing unit (CPU), a graphic processing unit (GPU), a neural processing unit (NPU), or the like in terms of hardware, and may execute computation or data processing for controlling other elements included in the electronic apparatus 100.

The processor 120 may be implemented as a micro processing unit (MPU) or a central processing unit (CPU) or the like coupled to a system bus and memory 110, such as a random access memory (RAM) and a read only memory (ROM).

The processor 120 may not only control the hardware elements included in the electronic apparatus 100, but also control execution of one or more software modules included in the electronic apparatus 100, and a result of the processor 120 controlling a software module may be derived as an operation for controlling hardware elements and functions thereof to perform operations of the electronic apparatus 100.

Specifically, the processor 120 may control the electronic apparatus 100 by executing at least one instruction stored in the memory 110.

The operations of the electronic apparatus 100 including the elements of FIG. 2 will be described in greater detail below.

The processor 120 may obtain training data pairs based on an already trained neural network model. The neural network model is a trained model using an original training data, and training data pairs correspond to new training data that the processor 120 generates to substitute the original training data.

The neural network model may be trained to determine an output value that corresponds to an input value. Specifically, the neural network model may be a neural network model trained to recognize a type of animal (for example: dogs, cats, etc.) or a human existing within an input image. Further, the neural network model may be a neural network model trained to output a voice recognition and translated results of input voice/text data. However, examples of the neural network model operations are not limited to the above described examples.

That is, the neural network model may be capable of identifying any object as long as the neural network model identifies an output value corresponding to a given input value, and the input value and the output value of the neural network model is not limited to a specific data form.

The neural network model may include one or more nodes or one or more layers to define the relationship between the input value and the output value. In the training process of the neural network model, a relationship between nodes (example: weight) or relationship between layers may be varied.

The neural network model trained based on the original training data including an input value and an output value may be stored in the memory 110. However, the original training data itself may not be stored in the memory 110.

The processor 120 may acquire or obtain an objective function based on a specific output value of the trained neural network model, and based on the objective function, may acquire or obtain an input value from the trained neural network model.

The specific output value may be any one from the output value that may be output from the neural network model.

The specific output value may be, for example, based on the neural network model being a classifier model trained to select any one from a plurality of classes based on an input value, one from an output value corresponding to a first class from a plurality of classes, an output value corresponding to a second class from the plurality of classes, or an output value corresponding to an instance difficult to see as in any of the classes from the plurality of classes, but the output values are not limited thereto.

The objective function may be defined as a function for finding an input value of the neural network model to output an output value corresponding to a specific output value.

The objective function may be a function including an output value that is the result of inputting an (arbitrary) input value to the neural network model and the specific output value. Specifically, objective function may be to show the relationship between the result of inputting the (arbitrary) input value to the neural network model and the output value.

The reason for using the objective function may be, based on an inverse function not being formed if the input value corresponding to the output value is not one, to find an input value in which the objective function satisfies a predetermined condition by repeating the process of changing the input value and applying to the objective function. Further, as an effect of the electronic apparatus according to the disclosure described hereafter with respect to FIGS. 8A to 8C, acquiring a plurality of input values corresponding to the same output value and using the output value as (new) training data to contribute in the improvement of the training results has meaning in terms of using an objective function.

The predetermined condition may include the condition of the value of the objective function being minimized or maximized. This is to acquire or obtain an input value in which the objective function is at a minimum or a maximum point, which is the result of changing the input values and consecutively applying the changed input values to the objective function.

For example, the objective function may be 'L(x)=|M(x)−y|,' wherein the predetermined condition may be L(x) being a minimum value or a maximum value. In this case, the processor 120 may compare the consecutive values (L(x1), L(x2), L(x3), . . . ) of the objective function with respect to the gradually changed input values (x1, x2, x3, . . . ) and determine the input value in which the value of the objective function is a minimum value or a maximum value. Further, the processor 120 may use a first differential value or more of an objective function with respect to the gradually changed input values to determine the input value in which the value of the objective function (example: L(x)) becomes a minimum or maximum value.

The predetermined condition may include a condition in which the value of the objective function is a value within a specific range. For example, based on the objective function being 'L(x)=|M(x)−y|' (wherein x is an input value, M(x) is an output value as a result on inputting the input value in a neural network model, and y is a specific output value), the value of the objective function (L(x)) may be a predetermined condition of being greater than 0.995 and less than 1.005.

The processor 120 may, based on an arbitrary input value, acquire or obtain an output value of the trained neural network model. Further, an output value of the objective function may be acquired by applying the output value of the trained neural network model to the objective function, and an input value may be acquired based on whether an output value of the objective function satisfies the predetermined condition.

Based on the value of the objective function according to the arbitrary input value described above satisfying the predetermined condition, the processor 120 may acquire an arbitrary input value and an output value acquired from the trained neural network model based on the arbitrary input value as new training data.

On the other hand, based on the value of the objective function according to the above described arbitrary input value not satisfying the predetermined condition, the processor 120 may change the arbitrary input value, and acquire an output value of the trained neural network model based on the changed input value.

In this case, the output value of the neural network model according to the changed input value may be applied to the objective function and may again acquire the output value of the objective function.

Further, the processor 120 may, based on the value of the objective function according to the changed input value satisfying the predetermined condition, acquire the changed input value and the output value acquired from the neural network model based on the changed input value as the new training data.

For example, the objective function being defined as L(x)=|M(x)−y| may be assumed. Based on x being input value and M(x) being input value input to the neural network model, the output value y corresponds to the specific output value.

Based on the predetermined condition being a condition in which the value of the objective function is a minimum value, the input value x is gradually changed from the arbitrary input value to acquire x, in which|M(x)−y| is the minimum value.

In this case, various numerical approaches may be used, such as a Gradient Descent of repeating the changing the input value from an arbitrary input value to a direction in which the output of the objective function becomes a maximum/minimum value, a Newton's Method of using a second partial differentiation value and applying a change of a lesser step, a Broyden-Fletcher-Goldfarb-Shanno (BFGS/L-BFGS) algorithm of estimating a second differential value with the modification of the Newton's Method and changing the input value, and a Hessian Free Optimization may be used, but the numerical approaches are not limited thereto.

The objective function may be defined as various functions including an output value (M(x)) of the original neural network model with respect to the input value (x) in addition to the examples described above and various functions including the specific output value (y), and may be described in various examples including, for example, L(x)=cross-entropy(M(x), y), L(x)=|M(x)−y|.

Figure 3:
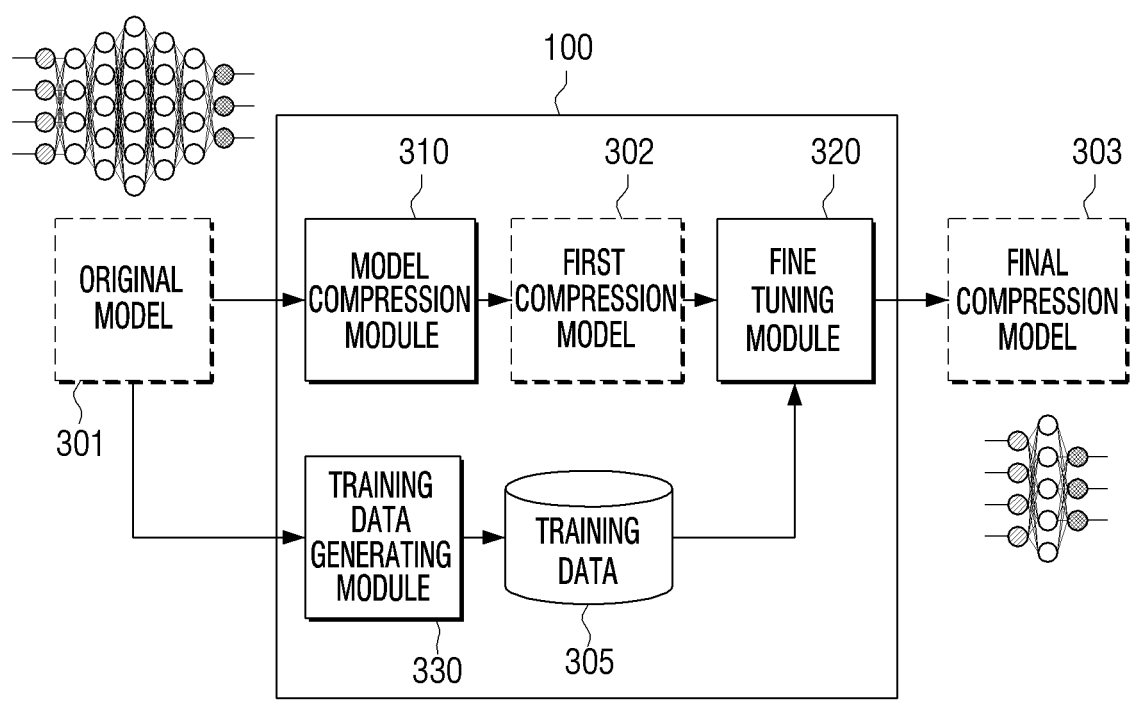
FIG. 3 is a diagram illustrating a compression process of an electronic apparatus according to an embodiment of the disclosure.

FIG. 3 is a diagram for describing a compression process of an electronic apparatus according to an embodiment of the disclosure. Referring to FIG. 3, the electronic apparatus 100 may further include a training data generating module 330 in addition to a model compression module 310 and a fine tuning module 320. The modules may be controlled by the processor 120, and each of the modules may be stored in the memory 110 of the electronic apparatus 100 in software form or implemented as a circuitry in hardware form. Further, each of the modules may be implemented in a form including a combination of both software and hardware.

Referring to FIG. 3, the processor 120 may use the model compression module 310 to compress (for example, to data size) the original neural network model 301 to acquire a first compression model 302.

The model compression module 310 may analyze the structure of the original neural network model, the complexity, the importance of each layer, or the like. Further, the model compression module 310, after selecting whether to apply a compression algorithm to a certain portion (node, layer, weight, etc.) in the entire model structure, may adopt the most effective compression algorithm with respect to the selected compression range.

In this case, the model compression module 310 may select a compression range and a compression algorithm considering the target compression rate according to the performance of the target apparatus in which a (final) compression neural network model completed with fine tuning is to be used, which will be described below with respect to FIG. 9.

A compression algorithm may include Weight Pruning, Channel Pruning, Matrix Factorization, Quantization, and the like, but the compression algorithm is not limited thereto.

Further, the model compression module 310 applies the adopted compression algorithm with respect to the selected compression range and may reduce data size of the original neural network model.

The above described example corresponds to an example of a model compression module 310 compressing an original neural network model, and different methods in part may be applied to select an optimum compression range and method. For example, various methods through simulated annealing and the like may be applied, and the most effective compression range and method therein may be selected.

The training data generating module 330 is a module for generating new training data 305, that is, training data pairs, capable of substituting for the training data 5 if there is no training data 5 to train the original neural network model, unlike the case of FIG. 1.

Based on new training data 305 being generated through the training data generating module 330, the fine tuning module 320 may use new training data 305 to train the first compression model 302. Accordingly, a final compression model 303 with recovered performance compared to the first compression model 302 may be acquired (a dataless compression without using the original training data).

Figure 4:
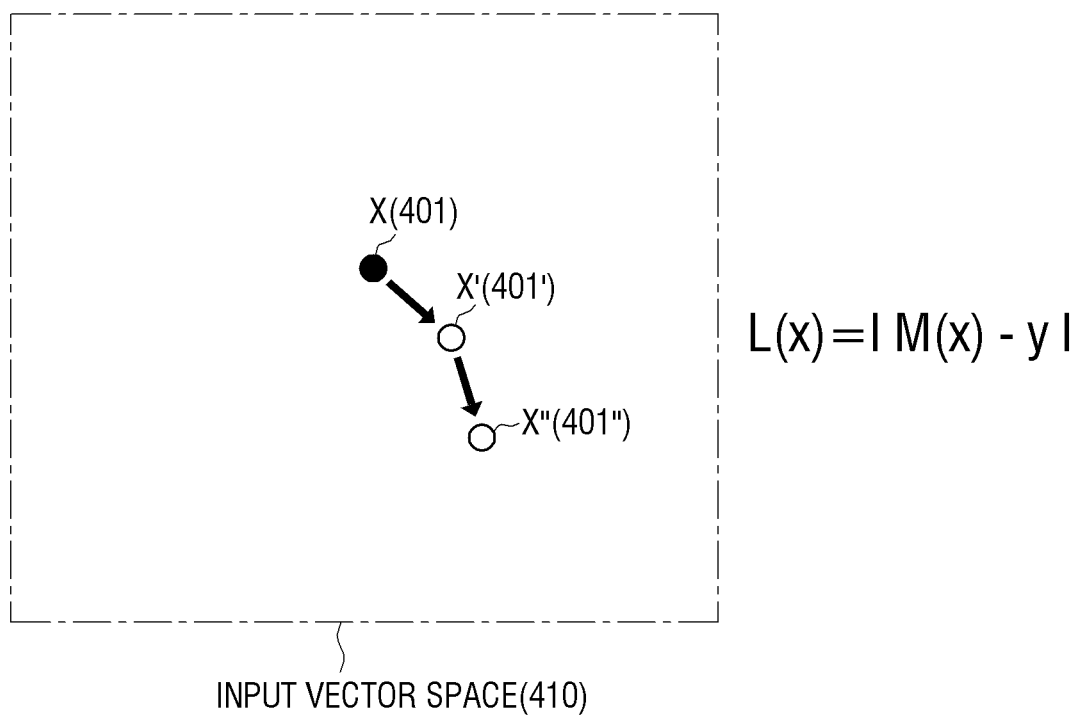
FIG. 4 is a diagram illustrating an example of a process of an electronic apparatus finding an input value satisfying an objective function.

FIG. 4 is a diagram for describing an example of a process of a processor 120 finding an input value of an objective function satisfying a predetermined condition through a training data generating module 330.

In FIG. 4, the objective function being $L(x)=|M(x)-y|$, and the predetermined condition being a condition in which the $L(x)$ value is a minimum value may be assumed.

Referring to FIG. 4, the training data generating module 330 may acquire an input value in which an arbitrary input value 401 on an input vector space 410 is applied to the objective function as a first x, and then the value of x is changed to x'(401'), x"(401") and the like so that the value of the objective function satisfies the minimum value of the predetermined condition. In this case, the training data generating module 330 may change the input value until the value of the objective function is a threshold value or less or may repeat the process of applying to the objective function. Further, the training data generating module 330 may acquire the input value with the smallest objective function value after changing the input value a predetermined number of times and applying the input value to the objective function.

The processor 120 may acquire a plurality of input values with respect to the specific output value.

Specifically, the processor 120 may, based on the output value of the objective function based on each input value of the plurality of input values satisfying the predetermined condition, acquire the input value corresponding to each input value of the plurality of input values. That is, while each of the plurality of arbitrary input values is applied to the objective function, and an input value satisfying the predetermined condition may be acquired.

Figure 5:
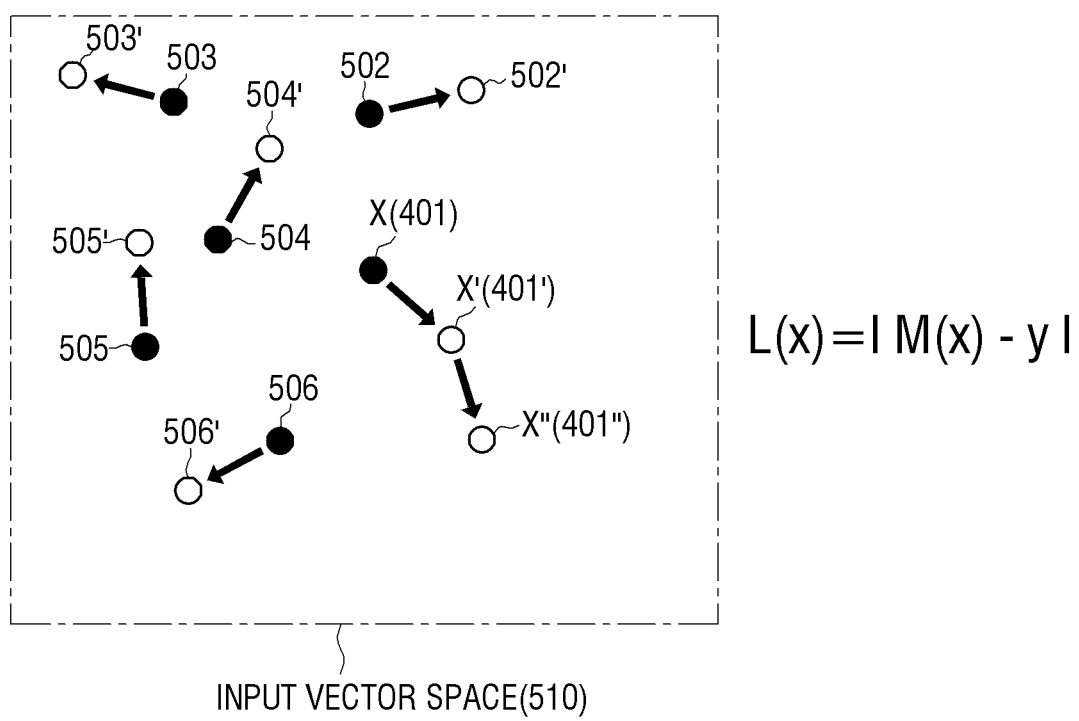
FIG. 5 is a diagram illustrating an example of a process of an electronic apparatus finding a plurality of input values satisfying an objective function.

FIG. 5 is a diagram illustrating an example of a process of a processor 120 finding a plurality of input values satisfying an objective function through the training data generating module 330.

Referring to FIG. 5, in order to acquire a plurality of input values satisfying the objective function with respect to the specific output value(y), the training data generating module 330 may change and apply the input values to the objective function not only with respect to the arbitrary input value of 401 but also with respect to 502, 503, 504, 505, 506, or the like.

Further, the training data generating module 330, which changes from each of the arbitrary input values (401, 502, 503, 504, 505, 506), and may acquire a plurality of input values satisfying the predetermined condition of the objective function.

The form of the objective function is not limited to the above described examples. The objective function, so long as an output value (M(x)) acquired from the neural network model according to the specific output value(y) and the (arbitrary) input value is included, may be available in various forms.

The processor 120 may acquire a plurality of input values using a plurality of specific output values. That is, the processor 120 may acquire the plurality of objective functions based on the plurality of specific output values of the (trained) neural network model and acquire an input value from the neural network model based on each of the plurality of objective functions.

In this case, the processor 120 may acquire the plurality of input values with respect to each of the plurality of the objective functions.

Figure 6:
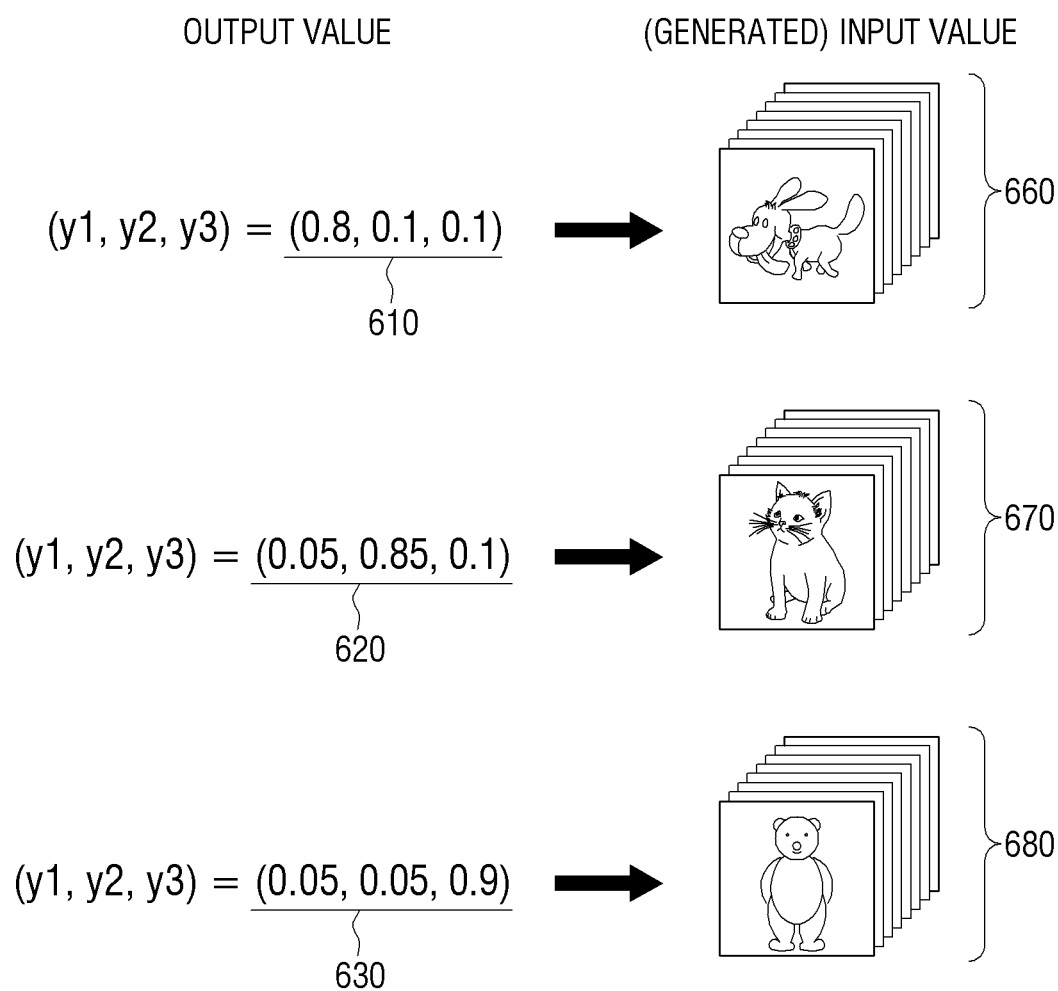
FIG. 6 is a diagram illustrating an example of an electronic apparatus acquiring a plurality of input values for each output value.

FIG. 6 is a diagram illustrating an example of the processor 120 acquiring the plurality of input values corresponding to each of the plurality of output values through the training data generating module 330.

The neural network model related to the output value and the input value of FIG. 6 is a neural network model trained to identify whether the input image data (for example: input value) is a dog or a cat.

In FIG. 6, y1 corresponds to the likelihood of the input image being a dog, y2 corresponds to the likelihood of the input image being a cat, and y3 corresponds to the likelihood of the input image not being either a dog or a cat, and (y1, y2, y3) correspond to output values capable of being output from the neural network model.

Referring to FIG. 6, the training data generating module 330 may acquire a plurality of images 660 (images including an object that perhaps resembles a dog or is a dog) corresponding to output values 610 in which the likelihood of an object detected in the images 660 as being a dog is 0.8, the likelihood of an object detected in the images 660 as being a cat is 0.10, and the likelihood of an object detected in the images 660 as being neither a dog nor a cat (e.g., a bear) is 0.1.

The plurality of images 660 may result from different starting points from one another (for example: an arbitrary input value first applied to the objective function). Further, with respect to the each of the plurality of images 660, the starting point may be the same, but the predetermined condition satisfying the objective function may be different or the method of acquiring an input value (image) satisfying the predetermined condition may be different.

The number of the plurality of images acquired by the training data generating module 330 may reach hundreds, thousands to tens of thousands or more. The greater the number of images (input values) are acquired, the greater the increase in effectiveness of fine tuning thereafter.

In this case, the training data generating module 330 may use a separate objective function for each of y1=0.8, y2=0.1, and y3=0.1. The plurality of images 660 correspond to input values satisfying all conditions of the objective function for each of y1(=0.8), y2(=0.1), and y3(=0.1).

Further, the training data generating module 330 may use the objective function including two or more of y1(=0.8), y2(=0.1), and y3(=0.1) at one time.

Referring to FIG. 6, the training data generating module 330 may acquire a plurality of images 670 (images including an object that perhaps resembles a cat or is a cat) corresponding to output values 620 in which the likelihood of an object detected in the images 670 as being a dog is 0.05, the likelihood of an object detected in the images 670 as being a cat is 0.85, and the likelihood of an object detected in the images 670 as not being either a dog or a cat (e.g., a bear) is 0.1.

Likewise, referring to FIG. 6, the training data generating module 330 may acquire a plurality of images 680 (images including an object that perhaps has no resemblance to either a cat or a dog) corresponding to output values 630 in which the likelihood of an object detected in the images 680 as being a dog is 0.05, the likelihood of an object detected in the images 680 as being a cat is 0.05, and the likelihood of an object detected in the images 680 as being neither a dog nor a cat (e.g., a bear) is 0.9.

Although, in FIG. 6, each image of the plurality of images 660, 670 and 680 acquired with the input values is illustrated as clear images only for convenience of description, the plurality of images generated from the actual training data generating module 330 may include images or the like such as a slightly blurred image, an image with much noise, and images in which the object to be identified is not clearly identifiable by the naked eye.

The processor 120 may, after acquiring one or more input values based on the above described embodiments, may acquire training data pairs including the acquired input values.

Specifically, the processor 120 may generate the acquired input value and the training data pairs including the output value of the neural network model acquired based on the acquired input value. In this case, the processor 120 may, in the form of data pairs (tuples) of a (input value, output value) form, store the acquired input value and the output value corresponding thereto in the memory 110. The processor 120 may generate training data pairs including the acquired input value and the specific output value, which is based on the acquired input value.

Accordingly, one or more training data pairs that each correspond to the one or more input values, that is, new training data, may be stored in the memory 110.

The processor 120 may, based on the input values acquired through the above described examples, acquire additional input values and generate additional training data pairs to be included in the new training data.

Specifically, based on the training data pairs including a first input value and a first output value of the neural network model acquired based on the first input value, the processor 120 may acquire a second input value based on the first input value, and acquire a second input value and a second output value of the neural network model acquired based on the second input value as additional training data pairs.

The processor 120 may obtain a second input value by post-processing a first input value. For example, based on the first input value corresponding to one image, the processor 120 may acquire a second input value through at least modifying the size of a portion of an area, reversing right to left, changing color, changing position, or the like within the one image. However, the form of the input value may be varied according to the neural network model, and the above described embodiment of post-processing input value corresponding to the image is merely one example and the technical idea herein is not limited thereto.

Further, the processor 120 may apply interpolation to the two input values included in the generated new training data to acquire additional input values.

Further, the processor 120 may train (for example: fine tuning) the compression neural network model in which the (trained) neural network model is compressed based on one or more training data pairs. In this case, compression and fine tuning may be additionally performed with respect to the 'trained compression neural network model' in which fine tuning is completed.

The (first compressed) compression neural network model may be generated as a result of the processor 120 of the electronic apparatus 100 compressing the original neural network model through model compression module 310 or the like, or may be generated as a result of performing compression in an external apparatus, such as a server.

Based on the compression neural network model being generated in the external apparatus, the generated compression neural network model may be received from the external apparatus to the electronic apparatus 100, and in this case, the electronic apparatus 100 may not include the model compression module 310 but rather the model compression module 310 may be included in the external apparatus.

Figure 7A:
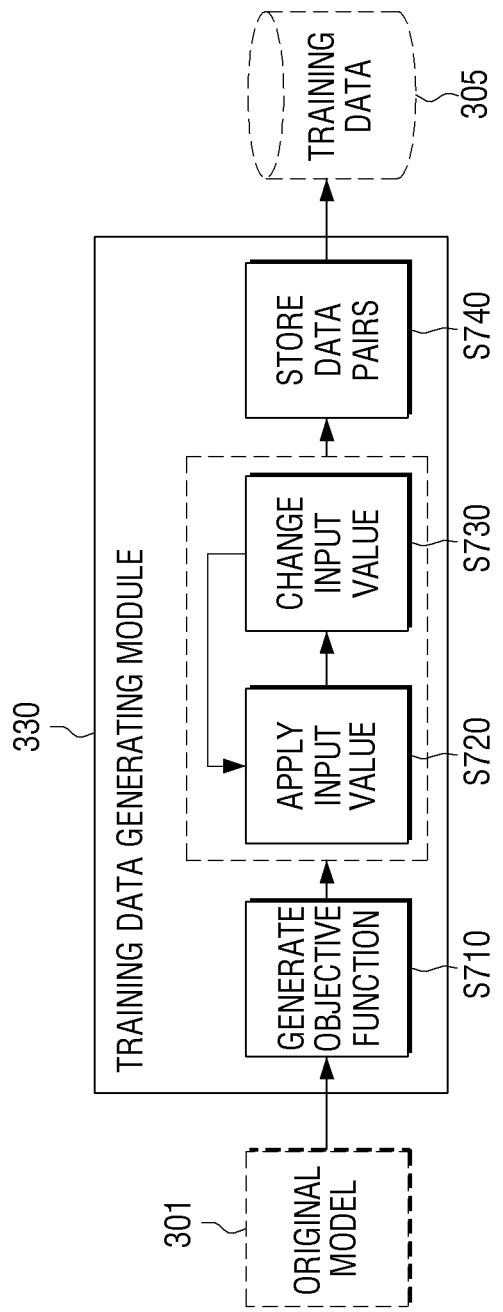
FIGS. 7A and 7B are block diagrams illustrating examples of specific operation processes of a training data generating module.
Figure 7B:
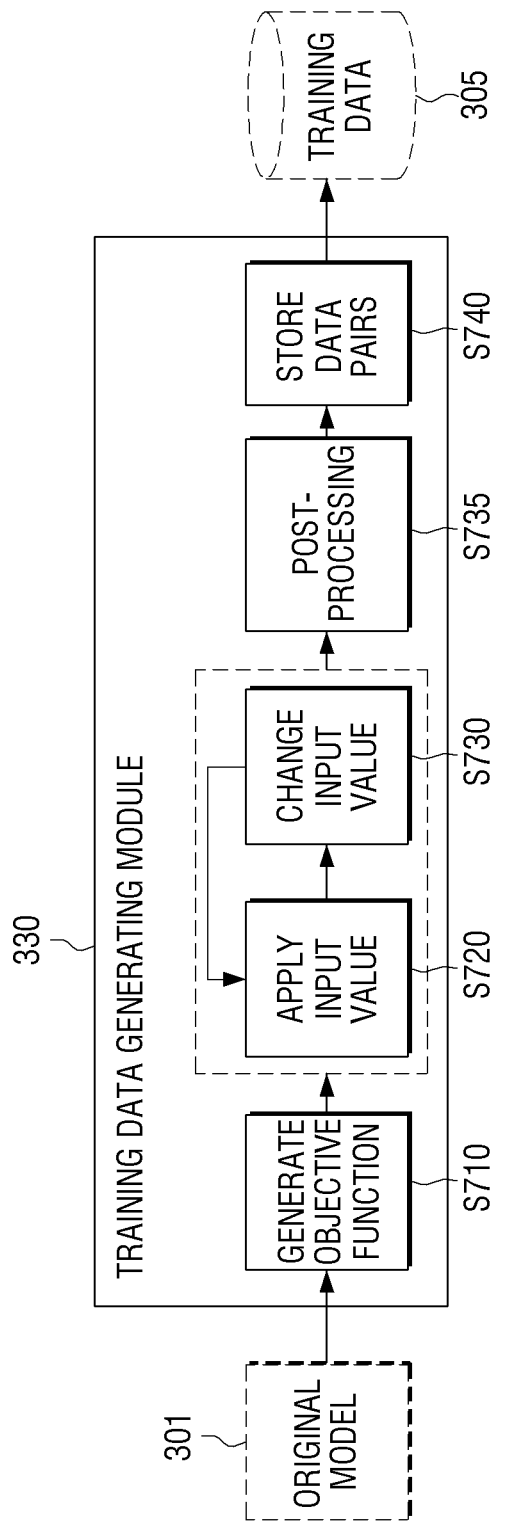

FIGS. 7A and 7B are block diagrams illustrating an example of an operation process of a training data generating module 330 according to an embodiment of the disclosure.

Referring to FIG. 7A, a training data generating module 330 may first use an original neural network model 301 and a specific output value (y) to generate an objective function S710. For example, an objective function such as $L(x)=|M(x)-y|$ may be generated. Here, y is an output value of a fixed target.

Further, the training data generating module 330 may apply an (arbitrary) input value to an objective function S720. In this case, based on the result of applying the relevant input value to the objective function satisfying a predetermined condition, the relevant input value may be stored. On the other hand, based on the relevant input value not satisfying a predetermined condition of the objective function, the relevant input value is changed S730, and the changed input value may again be applied to the objective function S720. The changed input value may, based on the result of applying the changed input value to the objective function satisfying a predetermined condition, store the changed input value.

For example, the training data generating module 330 may acquire $L(X_0)$ by inputting the first (arbitrary) input value ($X_0$) to the objective function, and may identify whether the acquired $L(X_0)$ value satisfies the predetermined condition (for example: of being less than the threshold value). Based on the $L(X_0)$ value satisfying the predetermined condition, $X_0$ may be acquired as the final input value.

Based on the $L(X_0)$ value not satisfying the predetermined condition, the training data generating module 330 may change the input value from $X_0$ to $X_1$. The training data generating module 330, as in the case of $L(X_0)$, may identify whether the $L(X_1)$ value satisfies the predetermined condition (for example: case of being less than the threshold value or if a number of iterations of changing the input value is greater than a predetermined number of iterations), and may acquire $X_1$ as the final input value based on satisfying the predetermined condition.

Based on $L(X_1)$ value not satisfying the predetermined condition, the training data generating module 330 may change the input value from $X_1$ to $X_2$. For example, based on the Gradient Descent method or the like being used, the $X_2$ value may be acquired considering the changing value of the previous $X_0 \rightarrow X_1$ and the changing value of $L(X_0) \rightarrow L(X_1)$. Likewise, based on identifying whether $L(X_2)$ satisfies the predetermined condition, $X_2$ may be acquired as the final input value if the predetermined condition is satisfied.

Accordingly, the training data generating module 330 may acquire the final input value by changing/applying the input value from the first $X_0$. Further, output 'Y', which is the result of inputting the acquired final input value 'X' to the original neural network model may be acquired, and (X, Y) may be stored as training data pairs.

The training data generating module 330 may acquire a different final input value X' by repeating the changing/applying process described above even if starting from a different arbitrary input value ($X_0'$). In this case, the training data generating module 330 may acquire an output value Y' of the original neural network model with respect to X', and may store the training data pairs (X', Y').

Accordingly, the training data generating module 330 may generate and store new training data 305 that includes the stored input value and the output value acquired from the neural network model according to the stored input value as training data pairs S740.

The training data generating module 330 may iteratively repeat processes S710 to S740 for not only specific output value y, but also for one or more different output values to generate and store a plurality of training data 305. In this case, the output value may be varied from one another and the objective functions generated through process S710 may also be different from one another.

Referring to FIG. 7B, the training data generating module 330 may, after further generating an input value by post-processing S735 the input value stored through the processes S720 and S730, generate and store training data pairs including the additionally generated input value and the output value acquired from the neural network model through the additionally generated input value.

That is, the training data generating module 330 may store not only the training data pairs including the acquired input values through the previous processes S720 and S730, but also the training data pairs including the additionally generated input values as new training data.

For example, the final input value X acquired previously and the intermediate value of X' are generated to new input value (X"), and after acquiring output value Y" as a result of inputting X" to the original neural network model, (X", Y") may also be stored as training data.

Figure 8B:
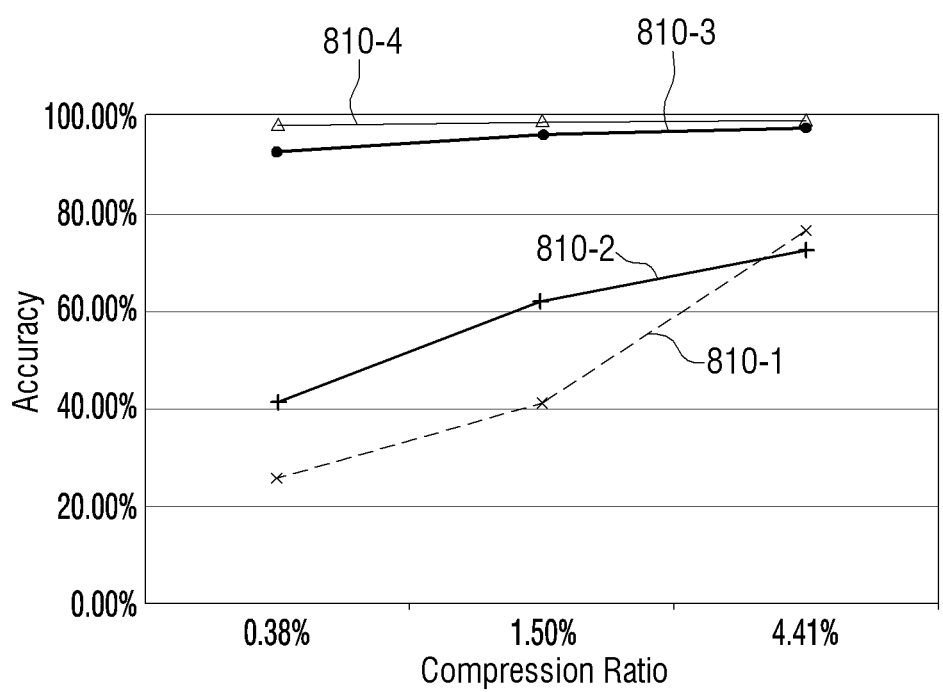
Figure 8C:
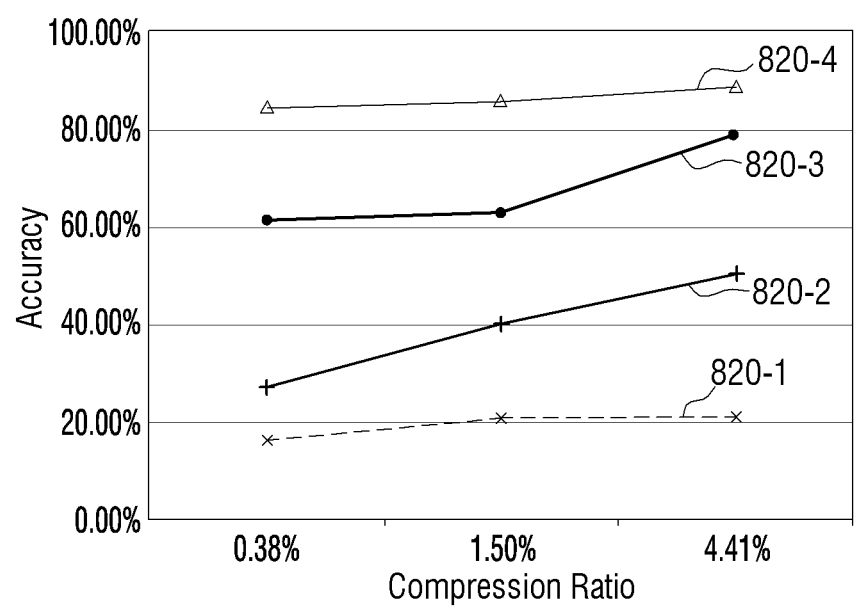

FIGS. 8A, 8B and 8C are tables and graphs for describing test results for describing an effect of the electronic apparatus which generates and uses new training data.

The 'test model' of FIG. 8A used in the testing is a neural network model for determining the number (10 classes from '0' to '9') corresponding to the given input values (images).

Referring to FIG. 8A, the 'test model' (original model) may have a structure in which a Convolution Layer and a Max Pooling Layer with a 'filter size' being 5 and the number of filters being 20, a Convolution Layer and a Max Pooling Layer with a 'filter size' being 5 and the number of filters being 50, a Fully-connected Layer with a 'hidden unit' number being 500, and a Fully-connected Layer with a 'hidden unit' number being 10 are consecutively connected.

FIG. 8B is a graph illustrating the accuracy (likelihood of accurately selecting a number corresponding to the given (input) image) of a compressed 'test model' according to the compression rate of the compressed 'test model.' The compression rate corresponding to a horizontal axis is the rate illustrating the size of the model compared to the original after compression. For example, based on the compression rate being 0.3 while the size of the original model was 10 M, the size of the compressed model may be 3 M.

FIG. 8B shows the test data of a 'test model' (the original model), which has been trained based on a MNIST dataset.

Specifically, FIG. 8B is a graph illustrating accuracy changes according to the compression rate for a compressed 'test model' not being separately trained (fine-tuned) 810-1, a compressed 'test model' being trained through an arbitrary input value and an output value of an original model ('test model') according to the arbitrary input value 810-2, being trained through the plurality of training data pairs acquired through the training data generating module 330 as in an embodiment 810-3, and being trained through the original training data (MNIST dataset) that trained the original model 810-4, respectively.

As illustrated, a near superior training accuracy may be verified when using the original training data 810-4 based on a plurality of training data pairs being trained acquired through the training data generating module 330 as in an embodiment 810-3. Specifically, a significantly superior accuracy may be verified in comparison to not performing fine tuning 810-1 and performing fine tuning using an arbitrary training data 810-2.

Referring to FIG. 8B, although the accuracy deterioration is natural the more compression is carried out (4.41%→1.50%→0.38%), in the instance of 810-3, it may also be verified that effect of the degree of accuracy deterioration according to the changes in compression rate is also significantly smaller compared to 810-1 and 810-2.

FIG. 8C is also a graph illustrating the accuracy of the compressed 'test model' according to the compression rate of the compressed 'test model.' However, unlike FIG. 8B, FIG. 8C is test data of the test model, which is the original model, that is trained based on a Fashion MNIST dataset.

FIG. 8C is a graph illustrating accuracy changes according to the compression rate for a compressed 'test model' not being separately trained (fine-tuned) 820-1, a compressed 'test model' being trained through an arbitrary input value and an output value of an original model ('test model') according to the arbitrary input value 820-2, being trained through the plurality of training data pairs including the plurality of input values acquired through the training data generating module 330 as in an embodiment 820-3, and being trained through the original training data (Fashion MNIST dataset) that trained the original model 820-4, respectively.

Referring to FIG. 8C, in being trained based on the plurality of training data pairs including the plurality of input values acquired from the specific output value as in the embodiments 820-3, a superior training accuracy may be verified using original training data 820-4, and a significantly superior accuracy may be verified with respect to the instances of 820-1 and 820-2.

Based on an electronic apparatus 100 performing a compression (for example: first compression, reducing data size) of the original neural network model, the electronic apparatus 100 may compress the original neural network model so that the size or dimension, other conditions, and the like of the compressed model may be varied according to the performance of the target apparatus, in which a trained (fine tuned) compression neural network model is to be used.

Specifically, the processor 120 may vary the degree of compression (compression range, compression algorithm, etc.) according to the performance, processing or memory capabilities, or type of the target apparatus.

FIG. 9 is a table for describing an example of a size or dimension of a compressed model varying according to a performance of a target apparatus.

In FIG. 9, it is assumed that a memory capacity of earphone 'a' is smaller than a memory capacity of smartphone 'c'. Referring to FIG. 9, since the memory capacity of earphone 'a' is smaller than the memory capacity of smartphone 'c', the processor 120 may, based on the target apparatus being earphone 'a', compress the original neural network model so that the size of the compression neural network model is 5 MB or less. On the other hand, based on the target apparatus being smartphone 'c', the processor 120 may compress the original neural network model so that the size of the compression neural network model is 100 MB or less.

Since the performance itself of the (trained) compression neural network model can only decrease as the same original network model is incrementally compressed, the electronic apparatus 100 may verify compression and fine tuning by targeting an accuracy error of within 10% based on earphone 'a' being the target apparatus, while targeting an accuracy error of within 5% based on smartphone 'c' being the target apparatus.

Referring to FIG. 9, the electronic apparatus 100 may, considering the RAM performance or the like of the target apparatus, set a computational quantity of the trained compression neural network model and a response rate target differently and perform compression and fine tuning. Of course, the electronic apparatus 100 may compress the neural network model based on one or more parameters, but not all parameters, illustrated in FIG. 9.

Figure 10:
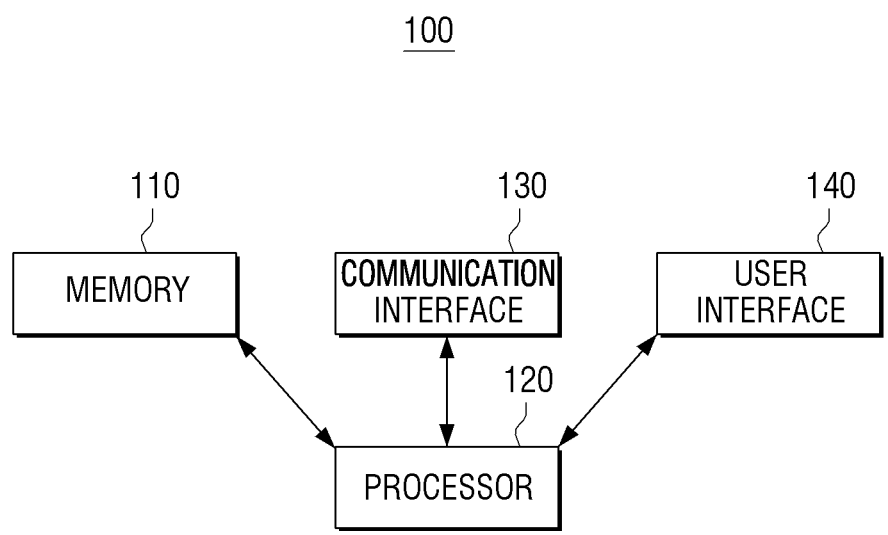
FIG. 10 is a block diagram illustrating a detailed configuration of an electronic apparatus according to various embodiments of the disclosure.

FIG. 10 is a block diagram illustrating a detailed configuration of an electronic apparatus 100 according to various embodiments of the disclosure.

Referring to FIG. 10, the electronic apparatus 100 may include in addition to the memory 110 and the processor 120, a communication interface 130, a user interface 140, and the like.

The communication interface 130 is configured to send and receive signal/data by performing communication with at least one external apparatus. To this end, a communication interface 130 circuitry may be included.

The communication interface 130 may include a wireless communication module, a wired communication module, and the like.

The wireless communication module may, in order to receive data from an external server or an external apparatus, include at least one of a Wi-Fi communication module, a Bluetooth module, an infrared data association (IrDA) communication module, a 3rd generation (3G) mobile communication module, a 4th generation (4G) mobile communication module, or a 4G long term evolution (LTE) mobile communication module.

The wired communication module may be implemented as a wired port such as a thunderbolt port, Ethernet, and a USB port.

The processor 120 may, based on receiving a request for a trained compression neural network model from an external apparatus through the communication interface 130, transmit the trained compression neural network model to an external apparatus or to a different external apparatus through the communication interface 130.

The processor 120 may, based on a user instruction input through a user interface 140, perform compression and/or fine tuning, or transmit the trained (fine tuned) compression neural network model to the external apparatus.

Specifically, the processor 120 may perform compression and/or fine tuning on the original neural network model selected according to user instruction through the user interface 140. Further, the processor 120 may perform compression and fine tuning on the original neural network model according to the data size, computational rate, or the like as selected by the user instruction and acquire a trained compression neural network model.

In addition, the processor 120 may control the communication interface 130 to transmit the trained compression neural network model to the target apparatus selected according to user instruction input through the user interface 140.

The user interface 140 may include one or more buttons, a keyboard, a mouse, or the like. In addition, the user interface 140 may include a touch panel implemented with a display or a separate touch pad.

The user interface 140 may include a microphone to receive input on user instruction or information by voice, and a camera to recognize user instruction or information in motion form.

Figure 11A:
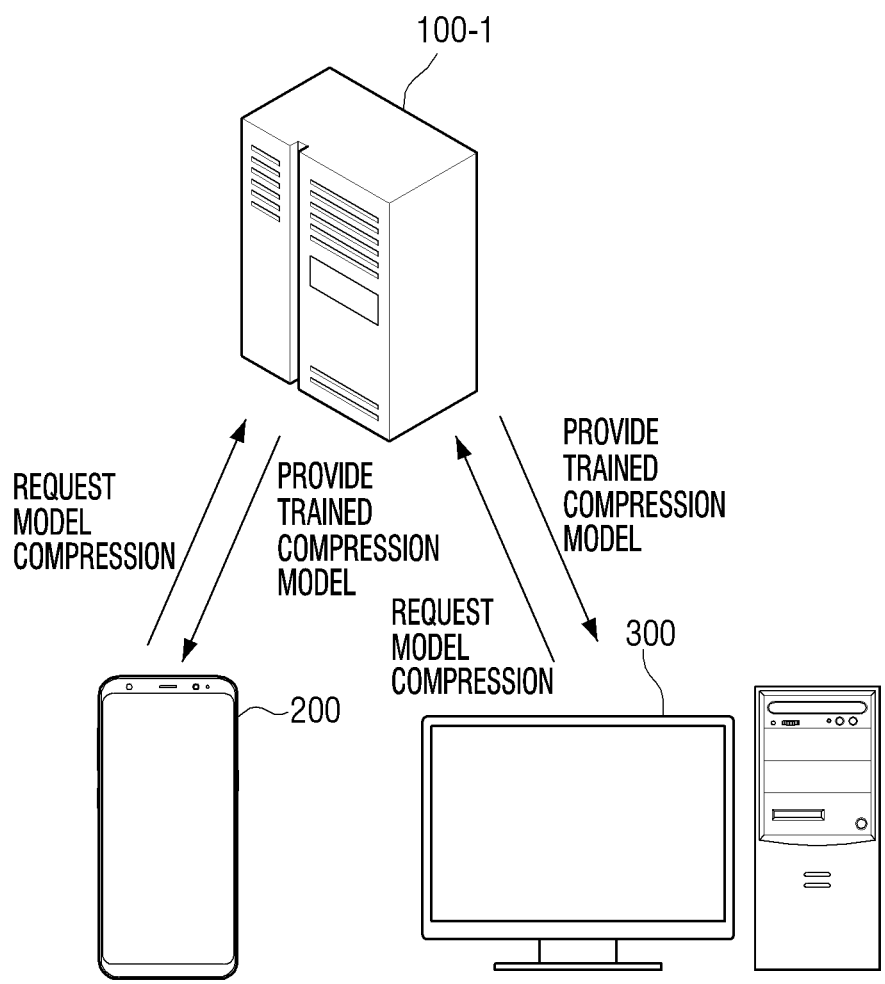
FIGS. 11A and 11B are a diagram and a block diagram illustrating an example of an electronic apparatus, which may be a server, providing a 'trained compression neural network model' according to a request of a user apparatus.
Figure 11B:
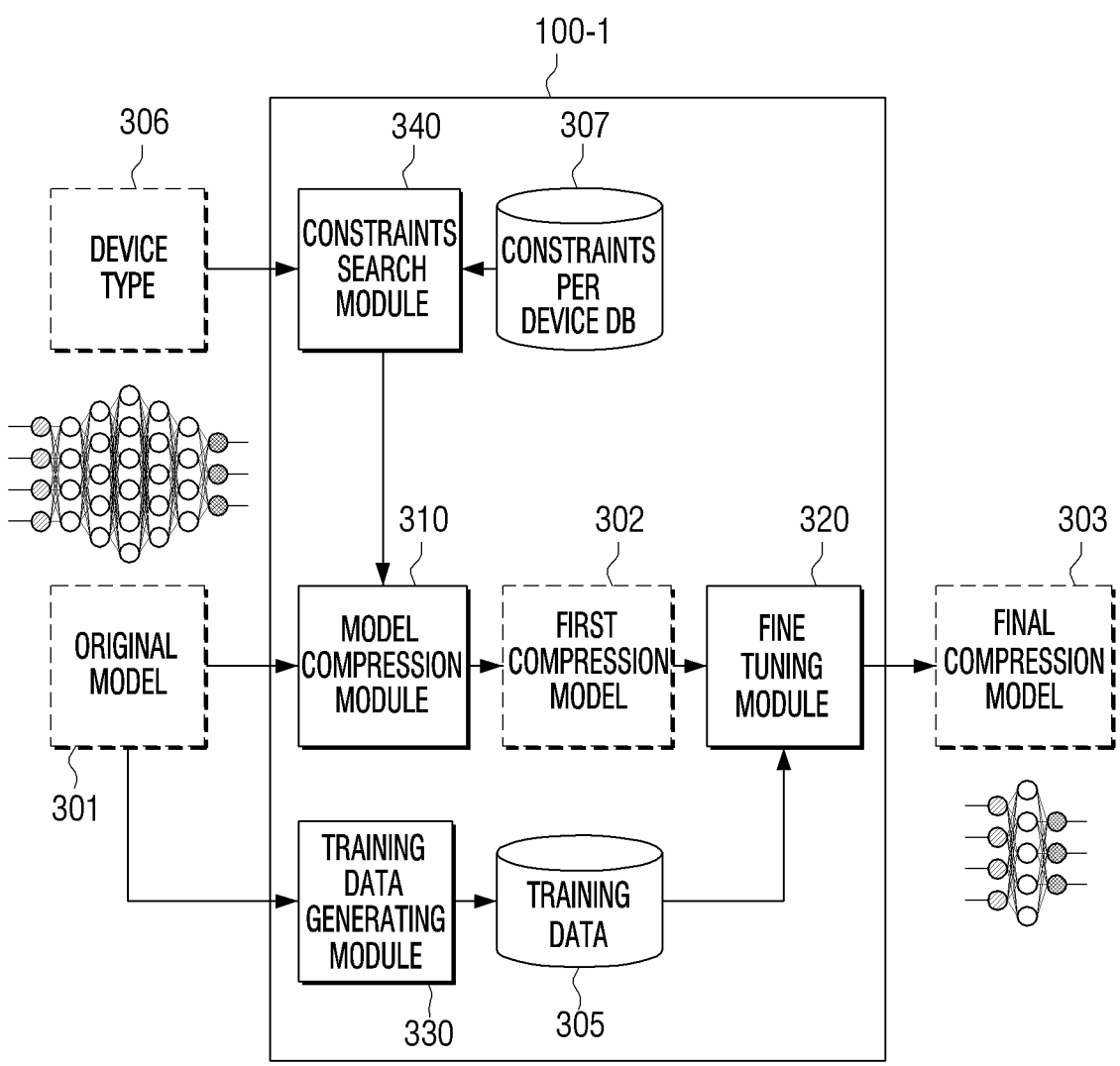

FIGS. 11A and 11B are a diagram and a block diagram illustrating an example of an electronic apparatus providing a compression neural network model requested from the user apparatus based on the electronic apparatus being implemented as a server apparatus.

Referring to FIG. 11A, the electronic apparatus 100-1, which may be a server apparatus, may perform communication with various user apparatuses 200 and 300. Based on receiving a request for model compression from any one of the user apparatuses, the electronic apparatus 100-1 may provide the trained compression model to the user apparatus that transmitted the compression request.

Specifically, the electronic apparatus 100-1 may receive the original neural network model and a compression request for the original neural network model from the user apparatus 200. The original neural network model may be a model already trained by specific training data, and the training data may not be received by the electronic apparatus 100-1.

The electronic apparatus 100-1 may generate a plurality of training data pairs using the received original neural network model.

The electronic apparatus 100-1 may first compress the received original neural network model, and may fine tune the compressed neural network model using the generated training data pairs. The fine tuned neural network model may then be transmitted to the user apparatus 200 as a final compression model.

The electronic apparatus, which is a server apparatus, may additionally receive information on the user apparatus 200 in addition to the trained original neural network model from the user apparatus 200. In the process or first compressing the trained original neural network model and/or in the process of fine tuning, the processor 120 of the electronic apparatus 100-1 may use the information on the received user apparatus 200.

Specifically, the processor 120 may identify information on the performance (memory capacity, computational rate, battery size/circumstance, etc.) of the user apparatus 200 included in the information on the user apparatus 200, determine a compression rate and accuracy appropriate for the performance of the user apparatus 200, and perform a first compression and fine tuning to ensure a desired compression rate and accuracy.

Referring to FIG. 11B, the electronic apparatus 100-1 may further include a constraints search module 340 in addition to the model compression module 310, the fine tuning module 320, and the training data generating module 330.

In FIG. 11B, it is assumed that an information on device type 306 of the user apparatus 200 is received in the electronic apparatus 100-1. The constraints search module 340 may identify a compression condition matching with the information on device type 306 of the user apparatus 200 through a constraints database (DB) per predetermined device (307), which may be stored in the memory 110 of the electronic apparatus 100-1. The compression condition may include a compression rate, a removable or changeable range in the compression process of the neural network model, a compression algorithm, a target capacitance for the compression result, or the like.

Further, the model compression module 310 may first compress the (original) neural network model according to the identified compression condition and generate the first compression model 302. The fine tuning module 320 may then, based on training the first compression model 302 using the new training data 305 generated by the training data generating module 330, generate a final compression model 303.

The processor 120 may then transmit the generated final compression model 303 to the user apparatus 200.

As described above, the embodiment using the constraints search module 340 is merely one example, and various other embodiments may be possible. For example, using the information on the remaining memory capacitance of the user apparatus 200 which received the model compression module 310 and included information on the user apparatus, a first compression model 302 may be generated by compressing the original model 301 to a size smaller than the remaining memory capacitance.

The electronic apparatus 100-1 may preemptively provide information on the 'final compression model' to the user apparatus 200 prior to acquiring the 'final compression model' having a compression rate and accuracy appropriate to the performance of the user apparatus 200. Based on receiving a request for receiving the 'final compression model' from the user apparatus 200, the electronic apparatus 100-1 may acquire the same (for example: first compressing and fine tuning the original model) and transmit the same to the user apparatus 200. Information on the simulation results (for example: performance comparison with the original model, etc.) on the operation of the 'final compression model' having a compression rate and accuracy appropriate to the performance of the user apparatus 200 may be provided to the user apparatus 200.

Figure 12A:
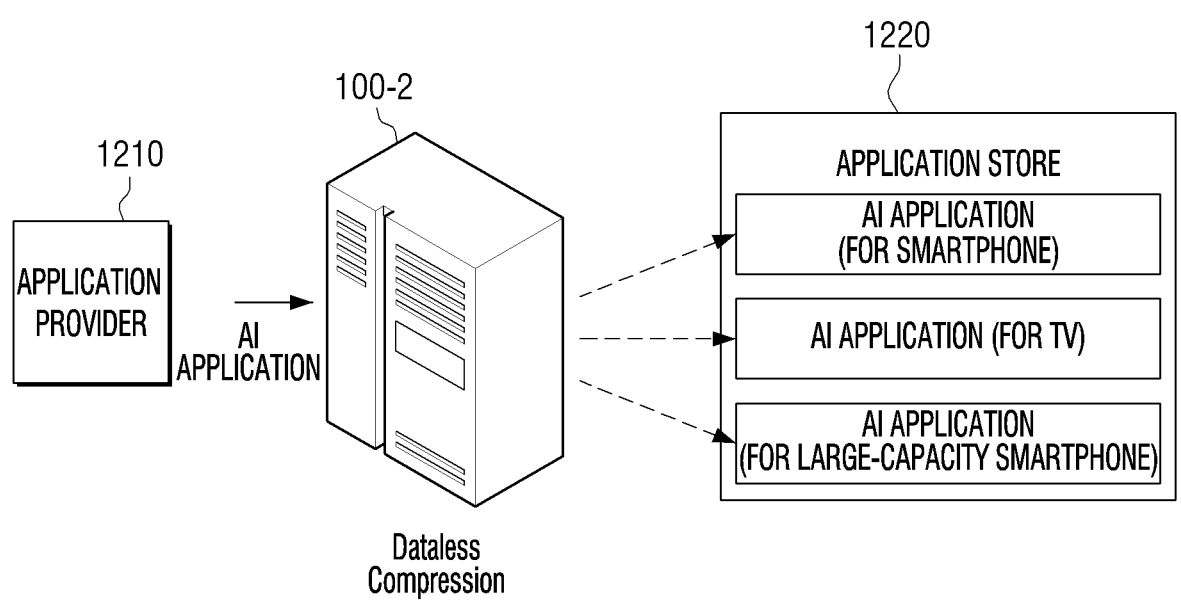
FIGS. 12A and 12B are a diagram and a block diagram illustrating an example of an electronic apparatus, which may be a server, reconstructing an AI application by compressing a neural network model within an AI application provided externally and providing the reconstructed AI application through an application store.
Figure 12B:
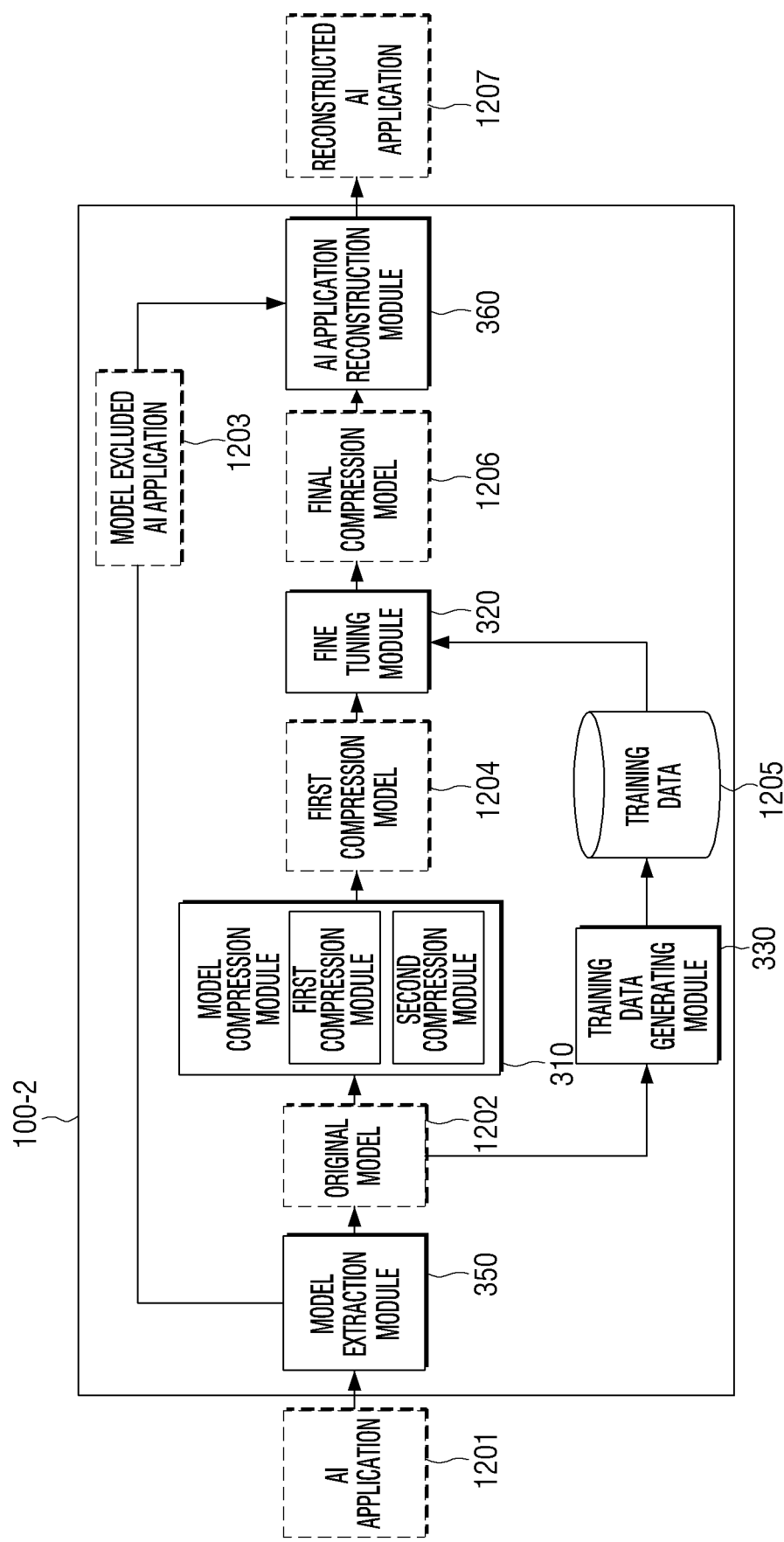

FIGS. 12A and 12B are a diagram and a block diagram illustrating an example of an electronic apparatus, which may be implemented as a server, reconstructing an AI application received externally and providing the reconstructed AI application to one or more user apparatuses through an application store. The AI application may be an application that includes an artificial intelligence neural network model.

Referring to FIG. 12A, the electronic apparatus 100-2, which may be a server apparatus, may receive the AI application from the application provider 1210. The application provider 1210 may refer to an apparatus, a server, or the like of the object developing or providing the AI application.

The application store 1220 of FIG. 12A may be a web service for providing various user apparatuses with various applications, and may be implemented through the electronic apparatus 100-2 or through a separate external server apparatus. Based on the application store 1220 being implemented through the external server apparatus, unlike FIG. 12A, the electronic apparatus 100-2 may receive the AI application that is registered with the application store 1220 from the external server apparatus.

The electronic apparatus 100-2 may separate the trained (original) neural network model from the received AI application. In this case, an address of the neural network model within the AI application pre-stored on the electronic apparatus 100-2 may be used or the file format of the neural network model is matched with a predetermined file format to identify the file including the neural network model within the AI application.

The electronic apparatus 100-2 may acquire one or more first compressed neural network models by first compressing the separated neural network model according to the appropriate requirement conditions of each of the one or more product names of category of products (smartphone, TV, large capacity smartphone, etc.).

The electronic apparatus 100-2 may then, based on acquiring the plurality of final compression models by fine tuning each of the one or more first compressed neural network models, combine each of the final compression models with the AI application (separated from the neural network model) and acquire one or more reconstructed AI applications.

The electronic apparatus 100-2 may register the reconstructed AI application at the application store 1220. If the application store 1220 is implemented through an external server apparatus, the electronic apparatus 100-2 may transmit the reconstructed AI application to the external server apparatus. The reconstructed AI application may be provided to the application store for each type of device, such as a smartphone, TV, etc., as illustrated in FIG. 12A.

Further, the electronic apparatus 100-2 may transmit a reconstructed AI application to an application provider 1210.

The user apparatus connected to the application store 1220 in which the reconstructed AI application is registered may download the reconstructed AI application according to user input. Specifically, as in FIG. 12A, based on a plurality of (reconstructed) AI applications being classified and registered according to the category of products (smartphone, TV, large capacity smartphone, etc.) on the application store 1220, the user apparatus may download the (reconstructed) AI application appropriate to the category of products which includes the user apparatus from the electronic apparatus 100-2 (or external server apparatus) through the application store 1220.

The electronic apparatus 100-2 may transmit simulation information for showing the performance of each plurality of reconstructed AI applications to the application provider 1210 and/or register at the application store 1220. For example, the user apparatus may receive simulation information through the application store 1220, and may provide the received simulation information to the user, and in this case, the user apparatus may download the corresponding AI application according to user input to download the (reconstructed) AI application appropriate to the category of products of the user apparatus from the electronic apparatus 100-2 (or external server apparatus).

FIG. 12B is a block diagram for describing a software structure of an electronic apparatus 100-2 operating together with FIG. 12A. Referring to FIG. 12B, the electronic apparatus 100-2 in addition to the model compression module 310, the fine tuning module 320, and the training data generating module 330, may further include a model extraction module 350, an AI application reconstruction module 360, and the like.

Referring to FIG. 12B, based on receiving the AI application 1201 from an external source, the model extraction module 350 may separate and extract the original neural network model 1202 from the data constituting the AI application. To this end, the model extraction module 350 may compare the predetermined file types (for example: extension name, etc.) on the neural network model with the plurality of files constituting the AI application, and separate and extract the neural network model file from the plurality of files.

Referring to FIG. 12B, the model compression module 310 may include a plurality of compression modules (first compression module, second compression module) compressing the neural network model according to different compression rates from one another. The plurality of compression modules may first compress the neural network model based on the condition of being a different category of products or product specification from one other. Accordingly, one or more first compression models 1204 may be acquired through the model compression module 310.

Specifically, the model compression module 310 may user the first compression module capable of compressing the neural network model according to the compression rate requested by the application provider 1210 from the plurality of compression modules to compress the neural network model. Further, the model compression module 310 may, based on compressing the neural network model using each of the plurality of compression modules, acquire a plurality of first compression models.

Further, the fine tuning module 320 may, using the training data 1205 generated from the original neural network model 1202 through the training data generating module 330, fine tune the first compression model 1204, and as a result thereof acquire the final compression model 1206.

The AI application reconstruction module 360 may combine the fine-tuned final compression model 1206 to the AI application 1203 with the separated neural network model and acquire a reconstituted AI application 1207, register the same at the application store 1220, and may transmit the same to the user apparatus.

Figure 13:
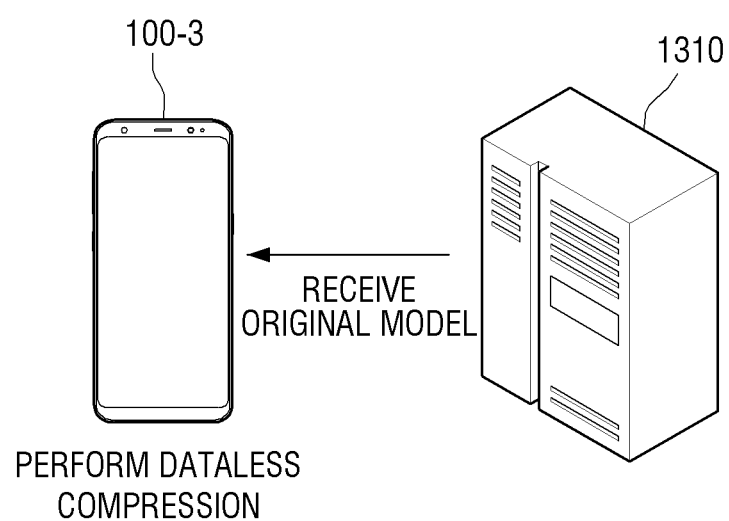
FIG. 13 is a diagram illustrating an example of an electronic apparatus, which may be a user apparatus, acquiring a trained compression neural network model from an original neural network model received from a server.

FIG. 13 is a diagram illustrating an example of an electronic apparatus being implemented as a user apparatus such as a smartphone and a personal PC.

Referring to FIG. 13, the electronic apparatus 100-3, which is implemented as a smartphone, may generate new training data including training data pairs from the original neural network model based on performing communication with a server 1310, and may acquire the trained compression neural network model.

For example, the electronic apparatus 100-3 may, based on receiving the original neural network model from the server 1310, generate new training data from the original neural network model, while compressing the neural network model to be appropriate with performance or constraints of the electronic apparatus 100-3.

The electronic apparatus 100-3 fine tunes the compressed neural network model through the new training data to acquire the trained compression neural network model, and uses the same to perform a function of the electronic apparatus 100-3.

Based on the target compression rate or the target accuracy corresponding to the performance of the electronic apparatus 100-3 falling outside a predetermined threshold range, the electronic apparatus 100-3 may not compress the neural network model and may inform the user visually or audibly that compression is not possible.

A model compression method of an electronic apparatus according to an embodiment is described in greater detail below through FIGS. 14 and 15.

Figure 14:
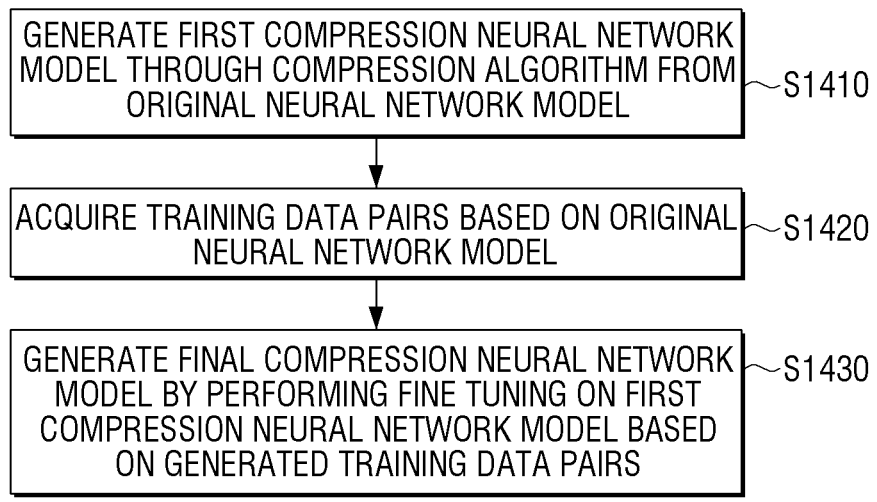
FIG. 14 is a flowchart illustrating a model compression method of an electronic apparatus according to an embodiment of the disclosure.

FIG. 14 is a flowchart illustrating a model compression method of an electronic apparatus according to an embodiment of the disclosure.

Referring to FIG. 14, the compression method may generate a first compression neural network model from the original neural network model through a compression algorithm S1410. The original neural network model may be trained based on the original training data and the data size of the first compression neural network model may be smaller than the data size of the original neural network model.

The compression algorithm may include Weight Pruning, Channel Pruning, Matrix Factorization, Quantization, or the like, but are not limited thereto.

The compression method may acquire training data pairs based on the original neural network model S1420.

The objective function may be acquired based on a specific output value of the original neural network model, and an input value may be acquired from the original neural network model based on the objective function.

Specifically, an output value of the original neural network model may be acquired based on an arbitrary input value, and an output value of the objective function may be acquired by applying the output value of the original neural network model to the objective function. Further, an input value may be acquired based on whether the output value of the objective function satisfies the predetermined condition.

Based on the output value of the objective function satisfying the predetermined condition, the arbitrary input value described above may promptly be acquired as the input value, and training data pairs including the acquired input value and the output value acquired from the original neural network model based on the acquired input value may be acquired.

Based on the output value of the objective function not satisfying the predetermined condition, the arbitrary input value described above may be changed, and may acquire an output value of the original neural network model based on the changed input value. Further, by acquiring the output value of the objective function by applying the output value of the original neural network model according to the changed input value to the objective function, and based on the output value of the objective function satisfying the predetermined condition, the changed input value may be acquired as the input value.

Accordingly, until the objective function finds an input value satisfying the predetermined condition, the input value may be changed and applied to the objective function.

Based on whether the output value of the objective function based on each of the plurality of input values satisfying the predetermined condition, input values corresponding to each of the plurality of input values may be acquired.

In addition, a plurality of objective functions may be acquired based on the plurality of specific output values of the original neural network model, and an input value may be acquired from the original neural network model based on each of the plurality of the objective functions.

Further, training data pairs that include the acquired input values may be acquired as new training data.

The training data pairs may include the acquired input value and the output value of the original neural network model according to the acquired input value. In addition, the training data pairs may include the acquired input value and the output value described above (the specific output value corresponding to the objective function used in finding the acquired input value).

In addition, an additional input value may be generated using the acquired input value, and training data pairs may be additionally generated according to the additional input value to increase the amount of new training data.

As a specific example, based on the acquired training data pairs including a first input value and a first output value of the neural network model acquired based on the first input value, a second input value may be acquired based on the first input value. Further, the second input value and a second output value of the original neural network model acquired based on the second input value may be acquired as additional training data pairs and included in the new training data.

The compression method may perform fine tuning on the first compression neural network model based on the generated one or more training data pairs and generate a final compression neural network model S1430.

Figure 15:
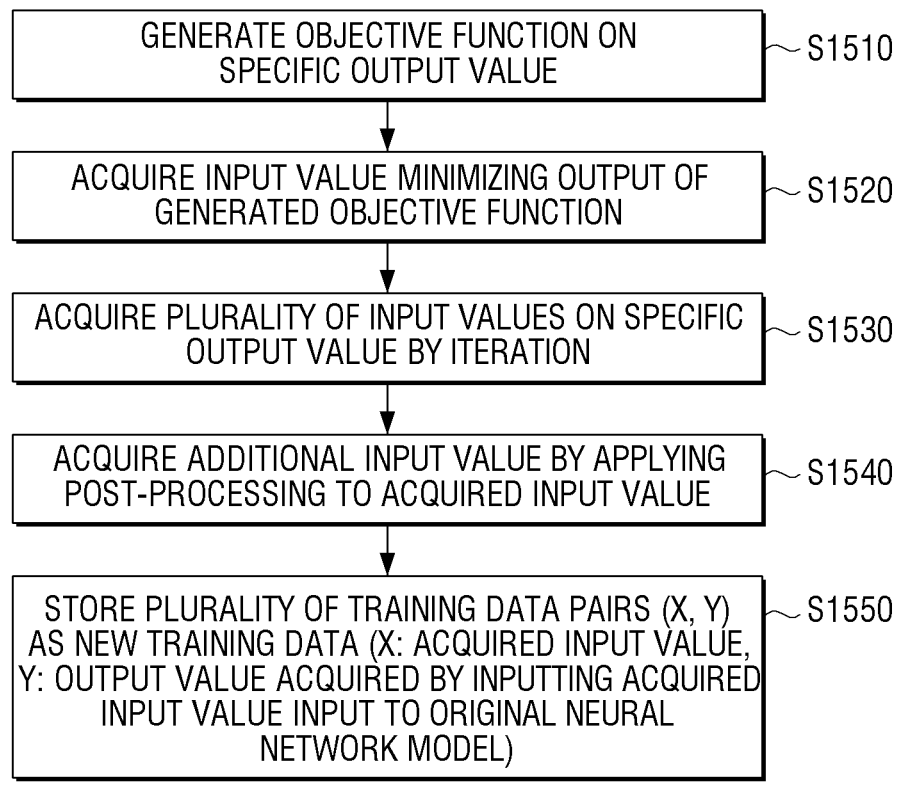
FIG. 15 is a diagram illustrating a detailed example of an model compression method acquiring training data pairs.

FIG. 15 is a flowchart illustrating a detailed example of the compression method generating training data pairs (new training data).

In order to generate training data pairs, the compression method may first generate an objective function on the specific output value from the values capable of being output from the neural network model S1510.

An input value that minimizes the output of the generated objective function may then be acquired S1520. Based on applying the input value beginning with the arbitrary input value and gradually changing the same and applying to the objective function, an input value that minimizes the output of the objective function may be found.

The arbitrary input value, which is the starting point, is set differently each time S1520, and based on repeating the process several times, a plurality of input values with respect to the specific output value may be acquired S1530.

Additional input values may be acquired by applying post-processing to the acquired input values S1540. Specifically, a portion of the data vale of the acquired input value may be changed or the acquired two or more input values may be combined using various methods to acquire a new input value.

The training data pairs including the acquired input value (x) and the output value (y), which is the result of inputting the acquired input value to the original neural network model, may be stored as new training data S1550.

Figure 16:
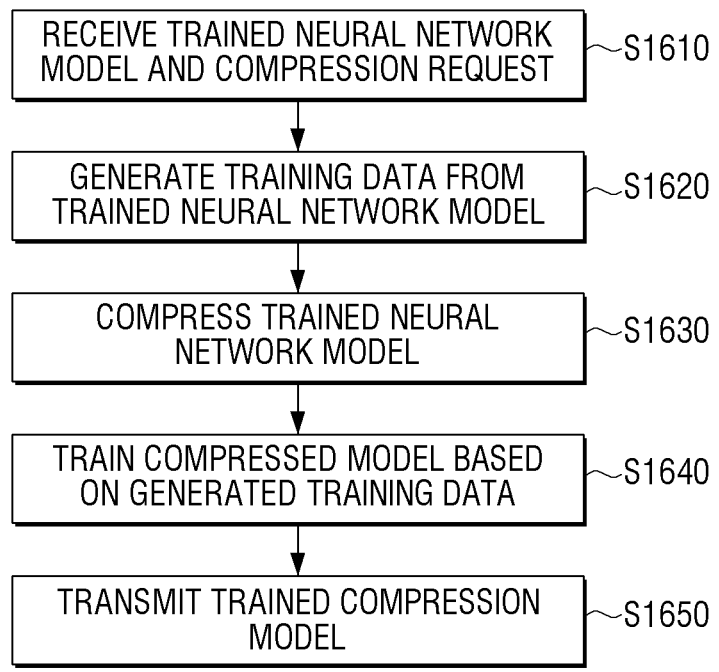
FIG. 16 is a flowchart illustrating an example of a model compression method of an electronic apparatus, which may be a server, providing a 'trained compression neural network model' according to a request of an external server.

FIG. 16 is a flowchart illustrating an example of a model compression method of an electronic apparatus, which may be implemented a server.

Referring to FIG. 16, the compression method may receive a trained neural network model (original model) and a compression request thereof from the external user apparatus S1610. Next, training data may be generated from the trained neural network model S1620. In this case, the objective function acquired through the specific output value may be used to acquire one or more input values, and the compression method may generate/store training data comprising data pairs including the acquired input value and the output value of the neural network model for the acquired input value.

The compression method may first compress the trained neural network model to reduce the size of the trained neural network model S1630. In this case, the generated training data is used to train the first compressed model to acquire the trained model (final compression model) S1640, and may transmit the trained model to the user apparatus that transmitted the compression request S1650.

Figure 17:
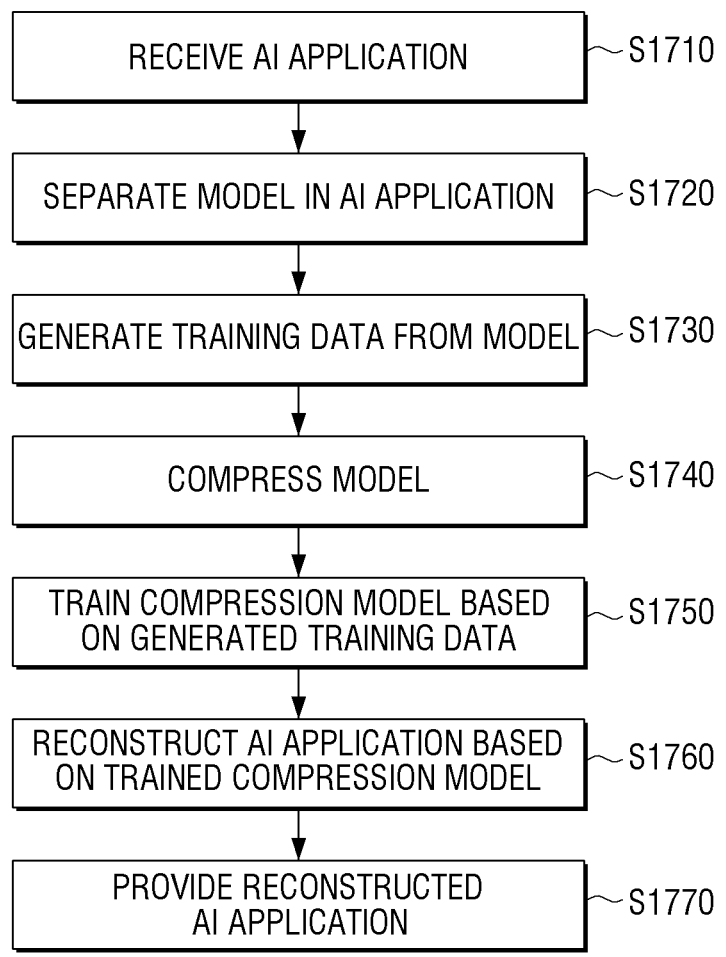
FIG. 17 is a flowchart illustrating an example of a model compression method of an electronic apparatus, which may be a server, reconstructing an AI application by compressing a neural network model, and providing the reconstructed AI application.

FIG. 17 is a flowchart for describing an example of an AI application providing method that reconstructs and provides the AI application. Referring to FIG. 17, the AI application providing method includes receiving the AI application from a third party provider, an external server (application store), or the like S1710, and may separate the neural network model from the AI application S1720. The neural network model may be a trained model through the original training data. For example, based on the AI application being an application that provides information on an object within an image, the neural network model included in the AI application may be an artificial intelligence model trained to recognize the objet included within the input image.

Further the AI application providing method may generate training data from the separated neural network model S1730, while compressing the corresponding neural network model S1740. Based on compressing the neural network model by varying the conditions according to product name, the category of the products, or the product performance a plurality of compression models may be acquired.

The 'trained compression model' may be acquired by fine tuning the compressed neural network model through the generated training data, and by combining the 'trained compression model' to the AI application with the separated neural network model, an AI application may be reconstructed S1760. Based on acquiring the plurality of compression models from S1740, a plurality of AI applications corresponding to each of the plurality of compression models may be acquired.

Further, the reconstructed AI application may be transmitted to a third party provider and/or registered in the application store S1770. For example, the reconstructed AI application may be registered in the application store, and the user may freely download the reconstructed AI application. Specifically, based on registering the plurality of AI applications, in which the compression rate is differently reconstructed according to the type of products, being registered in the application store, the user may selectively download AI applications appropriate to the user apparatuses from the reconstructed plurality of AI applications.

The compression method of the electronic apparatus described above through FIGS. 14 to 17 may be performed through the electronic apparatus 100 illustrated and described through FIGS. 2 and 10.

The compression method of the electronic apparatus described above through FIGS. 14 to 17 may be performed through the electronic apparatus 100 and through a system including the one or more electronic apparatuses.

The electronic apparatus may, based on extracting the dispersion of training data and the summarized knowledge from the already trained original neural network model, have the effect of generating a new training dataset that may substitute the actual training data used in the training of the original neural network model.

Further, by using the training dataset generated from the original neural network model such as in the above during the fine tuning process when performing model compression, there is the advantage of compression of the neural network model being possible with maintaining high recognition accuracy even without the actual original training data.

The various embodiments described above may be implemented in a recordable medium which is readable by computer or an apparatus similar to a computer using software, hardware, or the combination of software and hardware.

According to a hardware implementation, the embodiments described herein may be may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electric units for performing other functions.

In some cases, the embodiments described herein may be implemented by the processor 120 itself. According to a software implementation, embodiments such as the procedures and functions described herein may be implemented with separate software modules. Each of the software modules described above may perform one or more of the functions and operations described herein.

The computer instructions for performing processing operations of the electronic apparatus 100 according to the various embodiments described above may be stored in a non-transitory computer-readable medium. The computer instructions stored in this non-transitory computer-readable medium cause a specific device to perform the processing operations of an electronic apparatus 100 according to the various embodiments described above when executed by the processor of a specific device.

The non-transitory computer readable medium refers to a medium that stores data semi-permanently rather than storing data for a very short time, such as a register, a cache, a memory or the like, and is readable by a device. Specific examples of the non-transitory computer readable medium include a compact disc (CD), a digital versatile disc (DVD), a hard disc, a Blu-ray disc, a universal serial bus (USB), a memory card, a read only memory (ROM), and the like.

While the present disclosure has been illustrated and described with reference to various embodiments thereof, the present disclosure is not limited to the specific embodiments described. It will be understood by those skilled in the art that various changes in form and details may be made therein without departing from the spirit and scope of the disclosure.

What is claimed is:

1. An electronic apparatus comprising:
a memory storing computer-readable instructions; and
a processor which when executing the computer-readable instructions is configured to:
obtain an original neural network model;
compress the original neural network model according to a compression algorithm, to obtain a compressed neural network model;
generate training data pairs in the form of input-output data for training the compressed neural network model, based on the original neural network model; and
train the compressed neural network model using the training data pairs, to obtain a compressed and trained neural network model,
wherein the processor when executing the computer-readable instructions to generate the training data pairs is further configured to:
acquire an objective function based on a specific output value of the original neural network model;
acquire an input value from the original neural network model based on the objective function; and
acquire the training data pairs comprising the input value and the specific output value.

2. The electronic apparatus of claim 1, wherein the processor when executing the computer-readable instructions to generate the training data pairs is further configured to:
acquire an output value of the original neural network model based on the input value;
acquire an output value of the objective function by applying the output value of the original neural network model to the objective function; and
acquire the input value based on whether the output value of the objective function satisfies a predetermined condition.

3. The electronic apparatus of claim 2, wherein the processor when executing the computer-readable instructions to generate the training data pairs is further configured to, based on the output value of the objective function satisfying the predetermined condition, acquire the input value and the output value from the original neural network model as the training data pairs.

4. The electronic apparatus of claim 2, wherein the processor when executing the computer-readable instructions to generate the training data pairs is further configured to:
based on the output value of the objective function not satisfying the predetermined condition, change the input value to a changed input value;
acquire the output value of the original neural network model;
acquire the output value of the objective function by applying the output value of the original neural network model according to the changed input value to the objective function; and
based on the output value of the objective function satisfying the predetermined condition, acquire the changed input value and the output value acquired from the original neural network model based on the changed input value as the training data pairs.

5. The electronic apparatus of claim 2, wherein the predetermined condition comprises a condition of the output value of the objective function being a minimum value or a maximum value.

6. The electronic apparatus of claim 2, wherein the processor when executing the computer-readable instructions to generate the training data pairs is further configured to, based on whether the output value of the objective function based on each of a plurality of input values satisfies the predetermined condition, acquire input values corresponding to each of the plurality of input values.

7. The electronic apparatus of claim 1, wherein the processor when executing the computer-readable instructions is further configured to:
acquire a plurality of objective functions based on a plurality of specific output values of the original neural network model; and
acquire an input value from the original neural network model based on each of the plurality of objective functions.

8. The electronic apparatus of claim 1, claim 2, wherein the training data pairs comprise a first input value and a first output value of the original neural network model acquired based on the first input value, and
wherein the processor when executing the computer-readable instructions to train the compressed neural network model is further configured to:
acquire a second input value based on the first input value;
acquire the second input value and different training data pairs comprising a second output value of the original neural network model acquired based on the second input value; and
train the compressed neural network model based on the training data pairs and the different training data pairs.

9. The electronic apparatus of claim 1, further comprising:
a communication interface,
wherein the processor when executing the computer-readable instructions is further configured to, based on a request being received from an external apparatus through the communication interface, transmit the compressed and trained neural network model to the external apparatus through the communication interface.

10. A method of compressing a neural network model by an electronic device, the method comprising:
generating a compressed neural network model by compressing an original neural network model using a compression algorithm;
generating training data pairs in the form of input-output data based on the original neural network model; and
generating a compressed and trained neural network model by training the compressed neural network model based on the training data pairs,
wherein the generating the training data pairs comprises:
acquiring an objective function based on a specific output value of the original neural network model;
acquiring an input value from the original neural network model based on the objective function; and
acquiring the training data pairs comprising the input value and the specific output value.

11. The method of claim 10, wherein the generating the training data pairs comprises:
acquiring an output value of the original neural network model based on the input value;
acquiring an output value of the objective function by applying the output value of the original neural network model to the objective function; and
acquiring the input value based on whether the output value of the objective function satisfies a predetermined condition.

12. The method of claim 11, wherein the generating the training data pairs comprise:
based on the output value of the objective function satisfying the predetermined condition, acquiring the input value and the output value from the original neural network model as the training data pairs.

13. The method of claim 11, wherein the generating the training data pairs comprise:
based on the output value of the objective function not satisfying the predetermined condition, changing the input value to a changed input value;
acquiring the output value of the original neural network model based on the changed input value;
applying the output value of the original neural network model according to the changed input value to the objective function to acquire the output value of the objective function; and
based on the output value of the objective function satisfying the predetermined condition, acquiring the training data pairs comprising the changed input value.

14. The method of claim 11, wherein the generating the training data pairs comprises, based on whether the output value of the objective function based on each of a plurality of input values satisfies the predetermined condition, acquiring input values corresponding to each of the plurality of input values and acquiring the training data pairs comprising the input values.

15. The method of claim 10, wherein the generating the training data pairs comprises:
acquiring a plurality of objective functions based on a plurality of specific output values of the original neural network model; and
acquiring an input value from the original neural network model based on each of the plurality of objective functions.

16. The method of claim 10, wherein the training data pairs comprise a first input value and a first output value of the original neural network model acquired based on the first input value, and
wherein the method further comprises:
acquiring a second input value based on the first input value;
acquiring the second input value and a different training data pairs comprising a second output value of the original neural network model acquired based on the second input value; and
training the compressed neural network model based on the training data pairs and the different training data pairs.

17. The method of claim 10 further comprising, based on receiving a request from an external apparatus, transmitting the compressed and trained neural network model to the external apparatus.

18. A server apparatus comprising:
a memory storing computer-readable instructions;
a communicator; and
a processor which when executing the computer-readable instructions is configured to:
compress an original neural network model according to a compression algorithm, to acquire a compressed neural network model;
generate training data pairs in the form of input-output data for training the compressed neural network model based on the original neural network model;
train the compressed neural network model based on the training data pairs, to obtain a compressed and trained neural network model; and
output the compressed and trained neural network model through the communicator,
wherein the processor when executing the computer-readable instructions to generate the training data pairs is further configured to:
acquire an objective function based on a specific output value of the original neural network model;
acquire an input value from the original neural network model based on the objective function; and
acquire the training data pairs comprising the input value and the specific output value.

* * * * *